(12) United States Patent
Sako et al.

(10) Patent No.: US 9,798,144 B2
(45) Date of Patent: *Oct. 24, 2017

(54) WEARABLE IMAGE DISPLAY DEVICE TO CONTROL DISPLAY OF IMAGE

(71) Applicant: Sony Corporation, Tokyo (JP)

(72) Inventors: Yoichiro Sako, Tokyo (JP); Yasushi Miyajima, Kanagawa (JP); Hiroshi Mukawa, Kanagawa (JP); Tatsuya Narahara, Kanagawa (JP); Motoyuki Takai, Tokyo (JP); Masashi Takeda, Tokyo (JP); Hiroaki Ogawa, Chiba (JP); Seiji Wada, Kanagawa (JP); Ichigo Hayakawa, Tokyo (JP); Akira Tange, Tokyo (JP); Takao Tanikame, Kanagawa (JP); Kazuhide Kemmochi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/426,203

(22) PCT Filed: Jul. 1, 2013

(86) PCT No.: PCT/JP2013/068002
§ 371 (c)(1),
(2) Date: Mar. 5, 2015

(87) PCT Pub. No.: WO2014/041871
PCT Pub. Date: Mar. 20, 2014

(65) Prior Publication Data
US 2015/0253573 A1    Sep. 10, 2015

(30) Foreign Application Priority Data
Sep. 12, 2012 (JP) ................. 2012-200902

(51) Int. Cl.
*G09G 5/00* (2006.01)
*G02B 27/01* (2006.01)
(Continued)

(52) U.S. Cl.
CPC ......... *G02B 27/0172* (2013.01); *G06F 3/012* (2013.01); *G06F 3/013* (2013.01);
(Continued)

(58) Field of Classification Search
CPC ................ G09G 5/10; G09G 2360/144; G06F 3/012–3/015; G02B 27/0172
(Continued)

(56) References Cited

U.S. PATENT DOCUMENTS 5,076,664 A * 12/1991 Migozzi ................. G02B 23/10
359/630
5,130,794 A * 7/1992 Ritchey ..................... F41G 7/30
348/383
(Continued)

FOREIGN PATENT DOCUMENTS

| JP | 5-328257 A | 12/1993 |
| JP | HEI05328257 A | 12/1993 |

(Continued)

OTHER PUBLICATIONS

International Search Report from International Publication No. PCT/JP2013/068002 mailed Oct. 1, 2013.

*Primary Examiner* — Prabodh M Dharia
(74) *Attorney, Agent, or Firm* — Chip Law Group

(57) ABSTRACT

Provided is an image display device used by being mounted to a head or a face of a user, including a first display unit that displays an internal image seen from a side of the user, a second display unit that displays an external image seen
(Continued)

from outside the image display device, and a control unit that controls display of the internal image and the external image.

21 Claims, 31 Drawing Sheets

(51) Int. Cl.
    *G06F 3/01*            (2006.01)
    *G09G 5/10*            (2006.01)
    *H04N 13/04*          (2006.01)
    *H04N 5/64*            (2006.01)

(52) U.S. Cl.
    CPC .............. *G06F 3/015* (2013.01); *G09G 5/10* (2013.01); *H04N 13/044* (2013.01); *H04N 13/0497* (2013.01); *G02B 2027/0112* (2013.01); *G02B 2027/0118* (2013.01); *G09G 2360/144* (2013.01); *H04N 5/64* (2013.01)

(58) Field of Classification Search
    USPC ............. 345/1.1–9, 156–184, 419, 427, 545; 359/462, 630, 633; 715/788; 348/47
    See application file for complete search history.

(56) References Cited

U.S. PATENT DOCUMENTS

| | | | |
|---|---|---|---|
| 5,880,733 A * | 3/1999 | Horvitz | G06F 3/04815 345/427 |
| 5,991,085 A * | 11/1999 | Rallison | G02B 27/017 345/8 |
| 6,100,943 A * | 8/2000 | Koide | B60K 37/02 345/7 |
| 6,198,523 B1 | 3/2001 | Helbing | |
| 7,106,396 B2 | 9/2006 | Suzuki | |
| 7,196,751 B2 | 3/2007 | Suzuki | |
| 8,368,794 B2 | 2/2013 | Sako et al. | |
| 8,860,867 B2 | 10/2014 | Sako et al. | |
| 8,861,090 B2 | 10/2014 | Mukawa | |
| 8,982,471 B1 * | 3/2015 | Starner | G02B 5/30 359/13 |
| 2005/0168569 A1 * | 8/2005 | Igarashi | A61F 9/08 348/62 |
| 2006/0018017 A1 * | 1/2006 | Takahashi | G02B 21/0012 359/466 |
| 2006/0132914 A1 * | 6/2006 | Weiss | G02B 5/32 359/462 |
| 2006/0176242 A1 * | 8/2006 | Jaramaz | A61B 5/0059 345/7 |
| 2007/0143690 A1 * | 6/2007 | Nakajima | G09G 5/14 715/750 |
| 2007/0176847 A1 * | 8/2007 | Shah | G06F 1/1616 345/1.1 |
| 2008/0300055 A1 * | 12/2008 | Lutnick | G07F 17/3209 463/39 |
| 2009/0024050 A1 * | 1/2009 | Jung | A61B 5/16 600/544 |
| 2009/0213038 A1 * | 8/2009 | Huang | G02B 27/017 345/8 |
| 2009/0213114 A1 * | 8/2009 | Dobbins | G06F 3/011 345/419 |
| 2010/0079356 A1 * | 4/2010 | Hoellwarth | G02B 27/017 345/8 |
| 2010/0295860 A1 * | 11/2010 | Somerville | G09G 3/3216 345/545 |
| 2011/0083088 A1 * | 4/2011 | Cisler | G06F 9/4443 715/763 |
| 2011/0122500 A1 * | 5/2011 | Kobayashi | G02B 27/0172 359/633 |
| 2011/0285610 A1 * | 11/2011 | Yan | G09G 3/20 345/55 |
| 2012/0056876 A1 * | 3/2012 | Lee | H04N 13/0434 345/419 |
| 2012/0144416 A1 * | 6/2012 | Wetzer | H04N 21/25816 725/14 |
| 2012/0162549 A1 * | 6/2012 | Gao | G02B 27/0172 349/11 |
| 2012/0320034 A1 * | 12/2012 | Baron | G06F 17/50 345/419 |
| 2013/0063550 A1 * | 3/2013 | Ritchey | G03B 37/00 348/36 |
| 2013/0169545 A1 * | 7/2013 | Eaton | H04M 1/0241 345/173 |
| 2013/0201293 A1 * | 8/2013 | Konno | H04N 13/0239 348/47 |
| 2014/0059469 A1 * | 2/2014 | Patterson | G06F 11/1451 715/771 |
| 2014/0062854 A1 * | 3/2014 | Cho | G06F 3/017 345/156 |
| 2014/0160129 A1 * | 6/2014 | Sako | G06F 3/011 345/427 |
| 2014/0334010 A1 | 11/2014 | Mukawa | |
| 2014/0375559 A1 | 12/2014 | Sako et al. | |
| 2016/0167672 A1 * | 6/2016 | Krueger | A61M 21/00 340/576 |

FOREIGN PATENT DOCUMENTS

| | | |
|---|---|---|
| JP | 2000-075815 A | 3/2000 |
| JP | 200075815 A | 3/2000 |
| JP | 2001-100144 A | 4/2001 |
| JP | 2001100144 A | 4/2001 |
| JP | 2007-251331 A | 9/2007 |
| JP | 2007251331 A | 9/2007 |
| JP | 2008-065169 A | 3/2008 |
| JP | 2008065169 A | 3/2008 |
| JP | 2010-139688 A | 6/2010 |
| JP | 2010139688 A | 6/2010 |
| JP | 2010151997 A * | 7/2010 |
| JP | 2012-042654 A | 3/2012 |
| JP | 2012042654 A | 3/2012 |
| JP | 2012-093767 A | 5/2012 |
| JP | 2012093767 A | 5/2012 |
| JP | 2012-141461 A | 7/2012 |
| JP | 2012141461 A | 7/2012 |

* cited by examiner

FIG. 28

|  | CONCENTRATION, ATTENTION | | DROWSINESS | | SLEEP |
| --- | --- | --- | --- | --- | --- |
|  | HIGH | LOW | LOW | HIGH | |
| NUMBER OF BLINKS PER UNIT TIME | FEW | MANY | | | NONE |
| BLINK TIME | SMALL | | | LARGE | |

FIG. 29

|  | CONCENTRATION, ATTENTION | | DROWSINESS | | SLEEP |
| --- | --- | --- | --- | --- | --- |
|  | HIGH | LOW | LOW | HIGH | |
| BLINK INTERVAL ti | SMALL | LARGE | | | MAXIMUM |
| BLINK TIME tb | SMALL | | | LARGE | |

FIG. 30

|  | CONCENTRATION, ATTENTION | | DROWSINESS | | SLEEP |
| --- | --- | --- | --- | --- | --- |
|  | HIGH | LOW | LOW | HIGH | |
| BLINK INTERVAL ti | SMALL | LARGE | | | MAXIMUM |
| BLINK TIME tb | SMALL | | | LARGE | MAXIMUM |

WEARABLE IMAGE DISPLAY DEVICE TO CONTROL DISPLAY OF IMAGE

CROSS-REFERENCE TO RELATED APPLICATION

The present application is a national phase entry under 35 U.S.C. §371 of International Application No. PCT/JP2013/068002 filed Jul. 1, 2013, published on Mar. 20, 2014 as WO 2014/041871 A1, which claims priority from Japanese Patent Application No. JP 2012-200902 filed in the Japanese Patent Office on Sep. 12, 2012.

TECHNICAL FIELD

The technology disclosed in this specification relates to an image display device worn on the head and used to view an image, as well as an image display method and a recording medium, and more particularly, relates to an image display device, an image display method, and a recording medium that enables a viewer to view a display image as an enlarged virtual image with a virtual image optical system.

BACKGROUND ART

Head-mounted image display devices that are worn on the head and used to view images, or in other words, head-mounted displays, are known. A head-mounted image display device has an image display unit for each of the left and right eyes, in general, and by combining these with headphones, the head-mounted image display device is configured to enable control of visual perception and auditory perception. In addition, a head-mounted image display device is also capable of showing different images to the left and right eyes, and if an image with parallax between the left and right eyes is displayed, a three-dimensional image may be presented.

For the display unit for the left and right eyes, the head-mounted image display device is equipped with a high-resolution display panel made of liquid crystals or organic electroluminescence (EL) elements, for example. Head-mounted image display devices may be categorized into opaque and see-through types. An opaque head-mounted display device is configured to directly cover the user's eyes when mounted on the head, and increases immersion during image viewing. A virtual image optical system is used to enlarge and project a display screen, enabling the user to view an image as an enlarged virtual image with a suitable angle of view. In addition, if multi-channel audio is reproduced with headphones, it is possible to recreate the sense of being in a movie theater (for example, see Patent Literature 1). On the other hand, in the case of a see-through head-mounted image display device, it is possible to look at the outside surroundings past the image (that is, see through the image) even while the user is wearing the device on his or her head and an image is being displayed (for example, see Patent Literature 2). For this reason, the user is able to avoid dangers such as collisions with obstacles while using the device outdoors or while walking.

Meanwhile, with regard to flat-panel display devices, there is proposed a display device capable of displaying an image on both the front and back sides (for example, see Patent Literature 3 and 4). A double-sided display device may display the same content on both sides, or display separate content on both sides. Since the user may view an image both the front side and the back side of the device housing, a double-sided display device can be a good information providing tool.

On the other hand, the head-mounted image display device discussed above may display an image on the front side, that is, facing the eyes of the wearer, but does not display an image on the back side, that is, outward from the image display device. For this reason, nearby people are completely unable to check what the wearer is seeing. Also, since the wearer's eyes are covered, it is difficult for nearby people to grasp the status of the wearer (for example, whether it is alright to speak now or wait until later).

It can be argued that a head-mounted image display device is an ultimate personal display. However, people other than user him- or herself who is wearing the device are unable to know the status of the user, what the user is doing, what the user is viewing, or the degree to which the user is concentrating on or immersed in viewing. Furthermore, in some cases the user him- or herself may want to announce his or her own status, inform others of the content being viewed, or communicate useful information related to the content, but to do this the user must first remove the device, and viewing is interrupted.

SUMMARY OF INVENTION

Technical Problem

An objective of the technology disclosed in this specification is to provide an excellent image display device which is worn on the head and used to view an image, and which enables various information to be presented to nearby people, such as what the wearer is seeing and the current status of the wearer, as well as an image display method and a recording medium.

Solution to Problem

According to the first aspect of the present application in order to achieve the above-mentioned object, there is provided an image display method used by being mounted to a head or a face of a user, including a first display step that displays an internal image seen from a side of the user, a second display step that displays an external image seen from outside the image display device, and a control step that controls display of the internal image and the external image.

According to the second aspect of the present application, the display units of the image display device according to the first aspect are equipped with a single display device that displays the internal image and the external image, and a waveguide that guides the internal image displayed on the display device to a location seen from the side of the user, while also guiding the external image displayed on the display device to a location seen from outside the image display device.

According to the third aspect of the present application, the image display device according to the first aspect further includes a projection unit that projects the external image externally from the image display device.

According to the fourth aspect of the present application, the image display device according to the first aspect further includes an input operating unit with which the user conducts an input operation. The control unit controls display of the internal image and the external image according to an input operation by the user.

According to the fifth aspect of the present application, the control unit of the image display device according to the fourth aspect, according to an input operation by the user on the input operating unit, turns display of the internal image or the external image on/off, conducts a color adjustment of the internal image or the external image, conducts a brightness adjustment of the internal image or the external image, changes a display size of the external image, or moves a display area of the external image.

According to the sixth aspect of the present application, the control unit of the image display device according to the fourth aspect, according to an input operation by the user on the input operating unit, causes at least one of a same image as the internal image, a different image from the internal image, information about a surrounding environment, or a current status of the user to be displayed as the external image, or causes the external image to be displayed as the internal image.

According to the seventh aspect of the present application, the control unit of the image display device according to the fourth aspect changes display of the external image according an input operation based on a blink operation or eyeball movement of the user.

According to the eighth aspect of the present application, the control unit of the image display device according to the fourth aspect, according to an input operation by the user on the input operating unit, causes a continuous display, an intermittent display, or a display at a predetermined time interval of the external image to be conducted.

According to the ninth aspect of the present application, the image display device according to the first aspect further includes an environmental information acquisition unit that acquires information related to a surrounding environment of the image display device. The control unit controls display of the internal image and the external image on the basis of the surrounding environment.

According to the tenth aspect of the present application, the control unit of the image display device according to the ninth aspect controls a brightness of the external image in response to a detection of a change in environmental lighting.

According to the eleventh aspect of the present application, the control unit of the image display device according to the ninth aspect controls an intermittent display or a timer display of the external image in response to an elapsing of a current time.

According to the twelfth aspect of the present application, the control unit of the image display device according to the ninth aspect controls a turning of display on/off, a brightness level, a display area, and a display size of the external image according to a number of people nearby.

According to the thirteenth aspect of the present application, the image display device according to the first aspect further includes a status information acquisition unit that acquires information related to a status of the user. The control unit controls display of the internal image and the external image on the basis of a status of the user.

According to the fourteenth aspect of the present application, the control unit of the image display device according to the thirteenth aspect of the present application displays a current work status, action status, mental status, or physiological status of the user acquired by the status information acquisition unit as the external image.

According to the fifteenth aspect of the present application, the control unit of the image display device according to the thirteenth aspect of the present application identifies a mental status of the user on the basis of information of a blink operation of the user, and controls display of the external image according to the mental status.

According to the sixteenth aspect of the present application, the control unit of the image display device according to the thirteenth aspect of the present application controls text information in the external image to stay horizontal according to a horizontal tilt of the head of the user.

According to the seventeenth aspect of the present application, the control unit of the image display device according to the thirteenth aspect of the present application controls a position of the internal image or the external image to stay in place according to a rotation of the head of the user.

According to the eighteenth aspect of the present application, the image display device according to the first aspect of the present application further includes a content information acquisition unit that acquires content information related to image content to be displayed on the internal display unit. The control unit controls display of the external image according to the content information.

Further, according to the nineteenth aspect of the present application, there is provided an image display method used by being mounted to a head or a face of a user, including a first display step that displays an internal image seen from a side of the user, a second display step that displays an external image seen from outside the image display device, and a control step that controls display of the internal image and the external image.

Further, according to the twentieth aspect of the present application, there is provided a computer-readable recording medium having a computer program recorded thereon, the computer program controlling an image display device used by being mounted on a head or a face of a user, the computer program causing the computer to function as:

a first display unit that causes an internal image seen from a side of the user to be displayed;

a second display unit that causes an external image seen from outside the image display device to be displayed; and a control unit that controls display of the internal image and the external image.

Advantageous Effects of Invention

According to the technology disclosed in this specification, it is possible to provide an excellent image display device which is worn on the head and used to view an image, and which enables various information to be presented to nearby people, such as what the wearer is seeing and the current status of the wearer, as well as an image display method and a recording medium.

A head-mounted image display device according to the technology disclosed in this specification is equipped with an internal display unit seen from the side of the wearing user as well as an external display unit seen from the outside, and is able to provide various information externally by displaying, on the external display unit, information such as the same image as what the wearer is seeing, or the status of the wearer.

Further objectives, features, and advantages of the technology disclosed in this specification will be clarified by a more detailed description based on the exemplary embodiments discussed hereinafter and the attached drawings.

BRIEF DESCRIPTION OF DRAWINGS

FIG. 28 is a diagram exemplifying a method of determining the mental status (alert/drowsy/concentrating) of the user according to a number of blinks per unit time and a blink time detected with an oculo-electric technique.

FIG. 29 is a diagram exemplifying a method of determining the mental status (alert/drowsy/concentrating) of the user according to a blink interval and a blink time detected with an oculo-electric technique.

FIG. 30 is a diagram exemplifying a method of determining the mental status (alert/drowsy/concentrating) of the user according to a blink interval and a blink time detected with an image capture technique.

DESCRIPTION OF EMBODIMENTS

Hereinafter, an embodiment of the technology disclosed in this specification will be described in detail and with reference to the drawings.

As discussed earlier, head-mounted image display devices may be categorized into an opaque type (for example, see Patent Literature 1), and a see-through type (for example, see Patent Literature 2). The technology disclosed in this specification may be applied to either of these types.

A. Device Configuration

Figure 1:
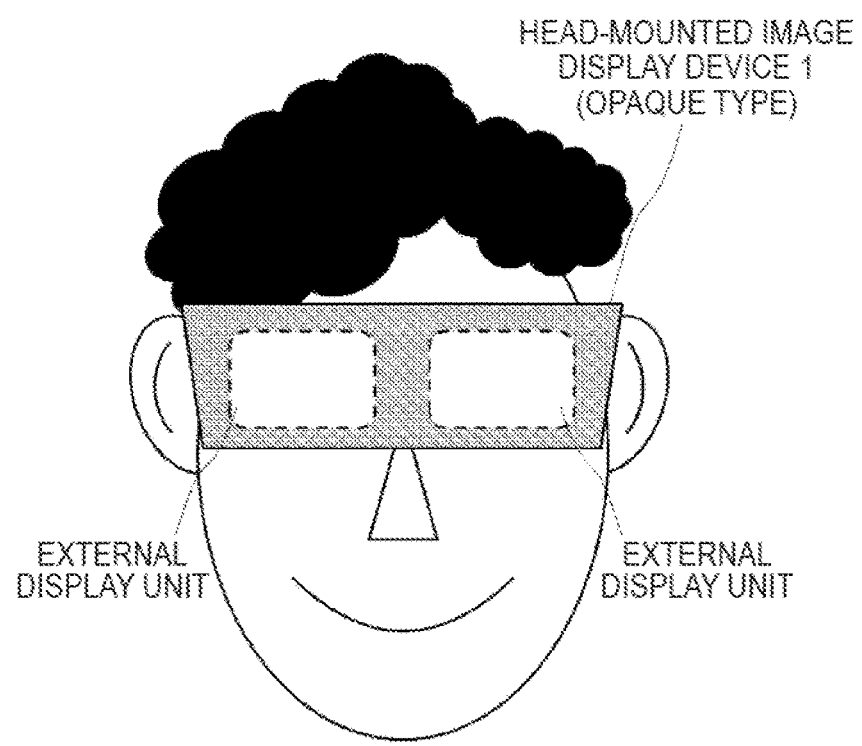
FIG. 1 is a diagram illustrating the frontal appearance of a user wearing a head-mounted image display device 1 of the opaque type.

FIG. 1 illustrates the frontal appearance of a user wearing a head-mounted image display device 1 of the opaque type.

As illustrated in FIG. 1, the user wears a non-transparent head-mounted image display device 1, and the left and right eyes are covered directly. The side of the head-mounted image display device 1 housing that faces the user's face is defined as "internal", while the opposite side is defined "external". While the user wears the head-mounted image display device 1, the internal face is viewable by the user only, whereas the other external face is exposed to the outside and may also be viewed by people on the outside. At a position opposing the left and right eyes on the internal side of the device 1 housing, an internal display unit that the user views (not illustrated in FIG. 1) is disposed. Also, on the external side of the device housing 1, an external display unit viewable by people on the outside is disposed. The internal display unit and the external display unit are made up of a micro-display such as organic EL elements or a liquid crystal display, for example.

Figure 2:
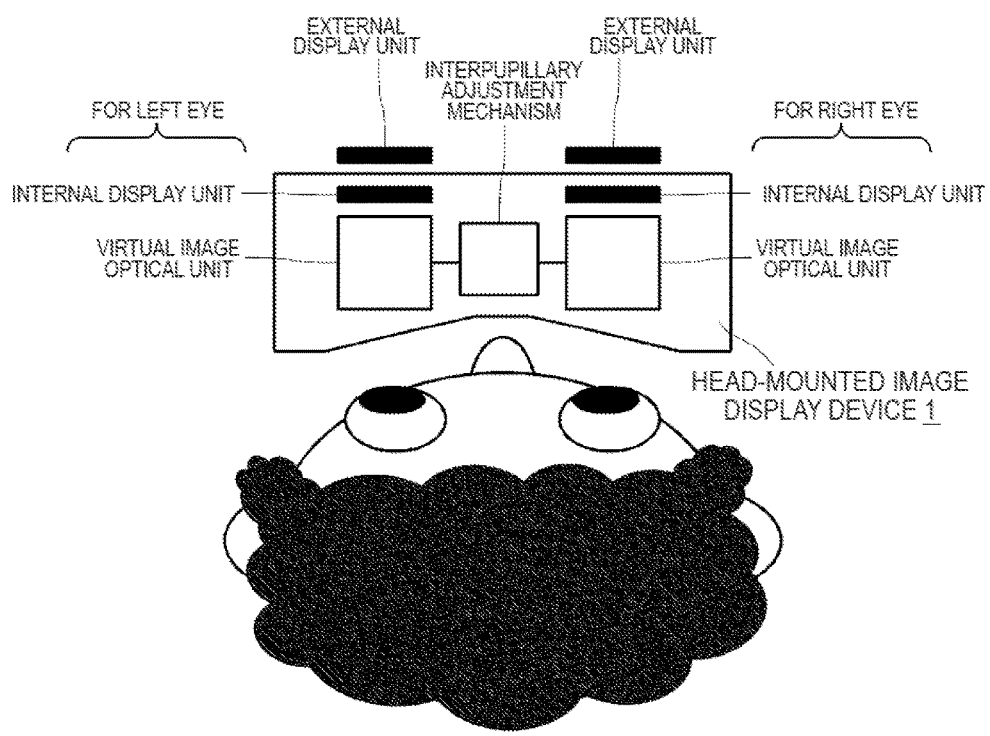
FIG. 2 is a diagram illustrating the overhead appearance of a head-mounted image display device 1 of the opaque type.

FIG. 2 illustrates the overhead appearance of a head-mounted image display device 1 of the opaque type. As illustrated in the drawing, the head-mounted image display device 1 has internal display units for the left and right eyes on the internal side, that is, the side that faces the user's face. The internal display units are made up of a micro-display such as organic EL elements or a liquid crystal display, for example. A display image of the internal display units is viewed by the user as an enlarged virtual image by transmitting through virtual image optical units. Also, since the height of the eyes and interpupillary width differ among individual users, it is necessary to align each of the left and right display systems with the user's eyes. For this reason, the head-mounted image display device 1 is equipped with an interpupillary adjustment mechanism that adjusts the interpupillary width between the right-eye display unit and the left-eye display unit.

In the head-mounted image display device 1 of the example illustrated in FIGS. 1 and 2, the external display units are disposed at positions in a front-and-back relationship with the internal display units, but the external display units may also be disposed in other locations. Also, although the head-mounted image display device 1 is equipped with a pair of left and right external display units, a single external display unit or three or more external display units may also be provided.

Note that, although omitted from illustration in FIGS. 1 and 2, the head-mounted image display device 1 is equipped with an audio output unit that outputs audio accompanying an image. Also, the head-mounted image display device 1 is equipped with a mounting unit (not illustrated) that mounts the relevant device 1 to the user's head or face. For example, the relevant device 1 is affixed to the head by a member such as a belt that wraps around the back of the wearing user's head (for example, see the specification of Patent Application No. 2011-48424 already submitted by the applicant). Also, although the head-mounted image display device 1 illustrated in FIGS. 1 and 2 is a binocular type equipped with display units for both the left and right eyes, the head-mounted image display device 1 may also be configured as a monocular type equipped with a display unit for only one of the left or the right.

Figure 3:
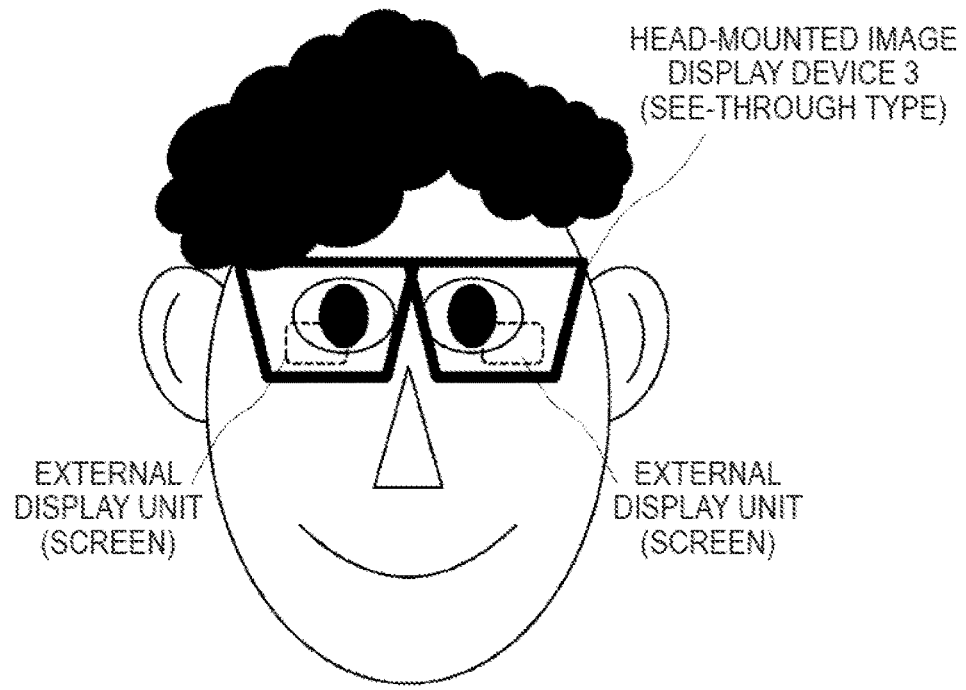
FIG. 3 is a diagram illustrating the frontal appearance of a user wearing a head-mounted image display device 3 of the see-through type.

On the other hand, FIG. 3 illustrates the frontal appearance of a user wearing a head-mounted image display device 3 of the transmissive, or in other words, see-through type.

In the example illustrated in FIG. 3, the head-mounted image display device 3 has a structure resembling eyeglasses for vision correction. The side of the head-mounted image display device 3 that faces the user's face is defined as "internal", while the opposite side is defined "external". While the user wears the head-mounted image display device 3, the internal face is viewable by the user only, whereas the other external face is exposed to the outside and may also be viewed by people on the outside. Virtual image optical units made of a transparent light guide unit or the like are disposed at positions on the device 3 housing that face the user's left and right eyes, and an image that the user views is displayed internally from the virtual image optical units. In addition, an external image viewable by people on the outside is displayed externally from the virtual image optical units. The virtual image optical units are supported by a support shaped like an eyeglasses frame, for example.

Figure 4:
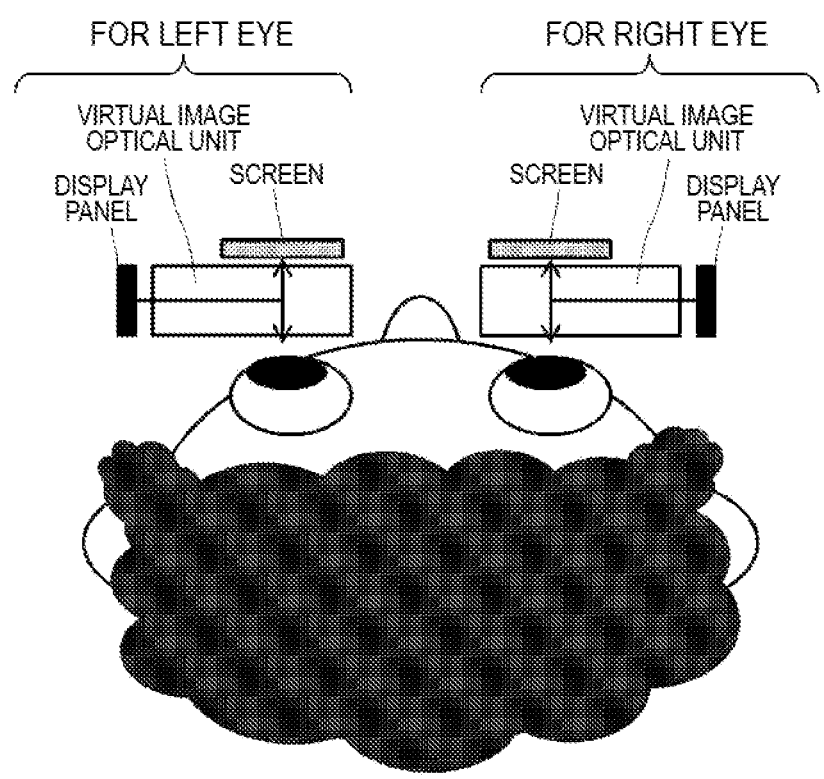
FIG. 4 is a diagram illustrating the overhead appearance of a head-mounted image display device 3 of the see-through type.

FIG. 4 illustrates the overhead appearance of the head-mounted image display device 3. As illustrated in the drawing, display panels that respectively output a left-eye image and a right-eye image are disposed on the left and right ends of the head-mounted image display device 3. The display panels are each made of a micro-display such as a liquid crystal display or an organic EL element, and respectively displays the frames of a left-eye and right-eye internal image and external image multiplexed by time division, for example. The left and right display images are guided to the vicinity of each of the left and right eyes by the virtual image optical units, and are also separated into an internal image and an external image. Subsequently, an enlarged virtual image of the internal image is formed on the user's pupils, while an enlarged virtual image of the external image is formed on screens disposed externally from the virtual image optical units. Note that a detailed description of the configuration by which the virtual image optical units guide the output images of the display panels, separate the internal image and the external image, and form enlarged virtual images will be deferred until later.

In the head-mounted image display device 3 of the example illustrated in FIGS. 3 and 4, the display regions of the external image are disposed at positions in a front-and-back relationship with the display regions of the internal image, but the external image may also be displayed in other locations. Also, although the head-mounted image display device 3 displays the external image at a pair of left and right locations, the external image may also be displayed at a single location or at three or more locations.

Note that, although omitted from illustration in FIGS. 3 and 4, the head-mounted image display device 3 is equipped with an audio output unit that outputs audio accompanying an image. Also, the head-mounted image display device 3 is equipped with a mounting unit that mounts the relevant device 3 to the user's head or face. For example, the relevant device 3 is worn on the head by placing temple units (not illustrated), which are rotatably supported on each of the left and right ends of the device 3 housing forming a shape resembling an eyeglasses frame, on the user's left and right ears. Also, although the head-mounted image display device 3 illustrated in FIGS. 3 and 4 is a binocular type equipped with display units for both the left and right eyes, the head-mounted image display device 3 may also be configured as a monocular type equipped with a display unit for only one of the left or the right.

Figure 5:
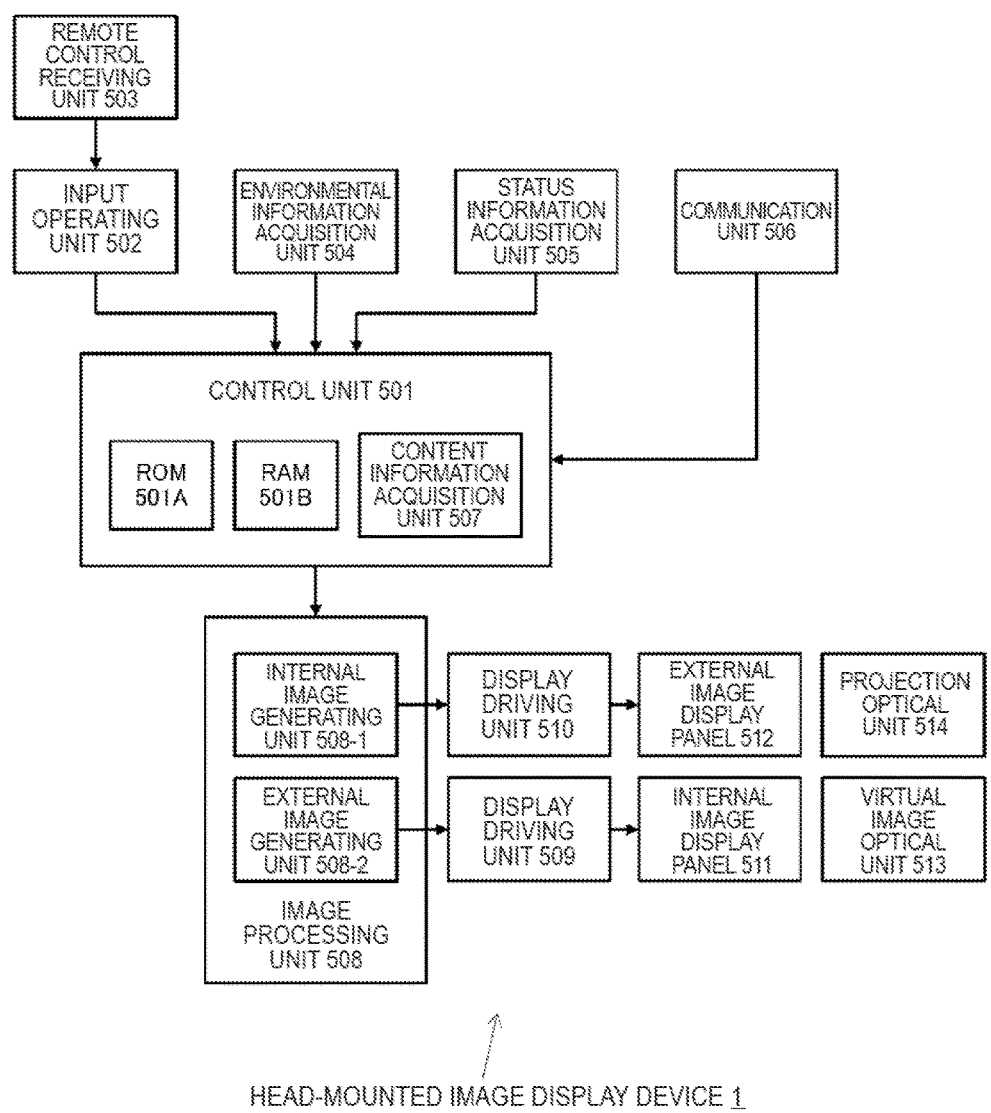
FIG. 5 is a diagram schematically illustrating a functional configuration of the head-mounted image display device 1 of the opaque type illustrated in FIGS. 1 and 2.

FIG. 5 schematically illustrates a functional configuration of the head-mounted image display device 1 of the opaque type illustrated in FIGS. 1 and 2. As discussed earlier, the head-mounted image display device 1 is equipped with functions for respectively displaying an internal image seen from the side of the user wearing the relevant device 1, and an external image viewed from the outside of the relevant device. Hereinafter, the respective components will be described.

The control unit 501 is equipped with read-only memory (ROM) 501A and random access memory (RAM) 501B. The ROM 501A stores program code executed by the control unit 501, and various data. The control unit 501, by executing a program loaded into the RAM 501B, controls the display of an internal image seen from the side of the user wearing the relevant device 1 and an external image seen from the outside, as well as centrally controlling the operation of the relevant device 1 overall. The data stored in the ROM 501A may include device identification information that identifies the relevant device 1, and other information unique to the device.

The input operating unit 502 is equipped with one or more operating elements on which the user performs an input operation, such as keys, buttons, and switches, receives user instructions via the operating elements, and outputs to the control unit 501. Also, the input operating unit 502 similarly receives user instructions made up of remote control commands received by the remote control receiving unit 503, and outputs to the control unit 501. Furthermore, the input operating unit 502 may also be configured to accept user instructions via eye movements or blink operations obtained from a status sensor (discussed later) such as a myoelectric sensor or an oculo-electric sensor.

In the present embodiment, the control unit 501 controls display operation for displaying an internal image seen from the side of the user wearing the relevant device 1 and an external image seen from the outside of the relevant device, in response to an instruction from the user via the input operating unit 502. For example, in response to an instruction from the user, the control unit 501 controls the turning on/off of the external image, the display method (such as the size, brightness, contrast, color tint, display position, and continuous display or intermittent display of the display image), and the information to display. In addition, the control unit 501 controls an external image linked or associated with the content displayed as the internal image in response to an instruction from the user.

The environmental information acquisition unit 504 acquires information related to the environment outside the head-mounted image display device 1, and outputs to the control unit 501. The environmental information acquisition unit 504 acquires information such as environmental light intensity, acoustic intensity, position or location, temperature, weather, time, an ambient image, and the number of people outside as the environmental information, for example. In addition, in order to acquire this environmental information, the environmental information acquisition unit 504 may also be equipped with various environmental sensors such as a light sensor, a microphone, a Global Positioning System (GPS) sensor, a temperature sensor, a humidity sensor, a clock, an image sensor (camera), and a radiation sensor (none illustrated in FIG. 5). Environmental information acquired from these environmental sensors is temporarily stored in the RAM 501B, for example.

In the present embodiment, the control unit 501 controls display operation for displaying an internal image seen from the side of the user wearing the relevant device 1 and an external image seen from the outside of the relevant device according to environmental information acquired by the environmental information acquisition unit 504. For example, according to environmental information, the control unit 501 controls the turning on/off of the external image, the display method (such as the size, brightness, contrast, color tint, display position, and continuous display or intermittent display of the display image), and the information to display. In addition, the control unit 501 controls an external image linked or associated with the content displayed as the internal image according to environmental information.

The status information acquisition unit 505 acquires information related to the status of the viewer wearing the head-mounted image display device 1, and outputs to the control unit 501. For the status information, the status information acquisition unit 505 acquires the user's work status (whether or not the user is wearing the device), the user's action status (the orientation of the wearing user's head, movement such as walking, and the open/closed state of the eyelids), mental status (indicating whether or not the user is immersed in or concentrating on viewing an internal image (or watching in the background as a distraction), such as excitement level, alertness level, or feelings and emotions), as well as the physiological status, for example. In addition, in order to acquire this status information from the user, the status information acquisition unit 505 may also be equipped with various status sensors such as a wear sensor made up of a mechanical switch and the like, a gyro sensor, an acceleration sensor, a velocity sensor, a pressure sensor, a body temperature sensor, a sweat sensor, a myoelectric sensor, an oculo-electric sensor, and a brain wave sensor (none illustrated in FIG. 5). Status information acquired from these status sensors is temporarily stored in the RAM 501B, for example.

In the present embodiment, the control unit 501 controls display operation for displaying an internal image seen from the side of the user wearing the relevant device 1 and an external image seen from the outside of the relevant device according to status information about the user's current status acquired by the status information acquisition unit 505. For example, according to user status information, the control unit 501 controls the turning on/off of the external image, the display method (such as the size, brightness, contrast, color tint, display position, and continuous display or intermittent display of the display image), and the information to display (the display of an icon expressing how much the eyes are open or the gaze direction, or text information). In addition, the control unit 501 controls an external image linked or associated with the content displayed as the internal image according to user status information.

The communication unit 506 conducts a communication process with another device, as well as modulation/demodulation and coding/decoding processes on communication signals. For example, the communication unit 506 receives an image signal to be displayed as an internal image from external equipment (not illustrated) that acts as an image source. Obviously, the communication unit 506 may receive from the external equipment an external image that differs from the internal image.

An internal image or external image that has been received, demodulated, and decoded by the communication unit 506 or other received data is supplied to the control unit 501. Also, the control unit 501 transmits transmission data to external equipment from the communication unit 506.

The configuration of the communication unit 506 is arbitrary. For example, the communication unit 506 may be configured according to a communication standard used for transmitting and receiving operations with external equipment that acts as a communication peer. The communication standard may be either wired or wireless. The communication standard referred to herein may be a standard such as Mobile High-Definition Link (MHL), Universal Serial Bus (USB), High-Definition Multimedia Interface (HDMI; registered trademark), Bluetooth (registered trademark) communication, or infrared communication.

The content information acquisition unit 507 acquires information of image content input via the communication unit 506. In the example illustrated in the drawings, the content information acquisition unit 507 is realized by a program executed in the control unit 501, but the content information acquisition unit 507 may also be configured as dedicated hardware outside the control unit 501. The content information acquisition unit 507 acquires content information such as, for example, metadata accompanying image content (such as the title, genre, and detailed information about the content, and the Uniform Resource Locator (URL)

of a related site), the total playback time of the image content, the current playback position or the remaining playback time, and parental controls or other usage restriction flags. In addition, the content information acquisition unit 507 is equipped with a decoder that decodes data such as text embedded in the main coded image content.

In the present embodiment, the control unit 501 controls display operation for displaying an internal image seen from the side of the user wearing the relevant device 1 and an external image seen from the outside of the relevant device according to content information acquired by the content information acquisition unit 507. For example, according to content information, the control unit 501 controls the turning on/off of the external image, the display method (such as the size, brightness, contrast, color tint, display position, and continuous display or intermittent display of the display image), and the information to display (such as a text string such as a URL that provides detailed information or related information about the content, or a QR code (registered trademark) that encodes a text string). In addition, the control unit 501 controls an external image linked or associated with the content displayed as the internal image according to content information.

The image processing unit 508 includes an internal image generating unit 508-1 that generates an internal image on the basis of an image signal output from the control unit 501, and an external image generating unit 508-2 that generates an external image on the basis of an image signal output from the control unit 501. The image processing unit 508 additionally conducts signal processing such as image quality correction on the generated internal image and external image, as well as conversion to a resolution suited to the screen of the internal image display panel 511 and the external image display panel 512, respectively. However, in the case of externally displaying the same image as the internal image, the external image generating unit 508-2 is omitted. Subsequently, the display driving units 509 and 510 each sequentially select the pixels of the internal image display panel 511 and the external image display panel 512 every row while performing line-sequential scanning, and supply a pixel signal based on the processed image signal.

The internal image display panel 511 and the external image display panel 512 are made of micro-displays such as organic EL elements or liquid crystal displays, for example (the internal image display panel 511 and the external image display panel 512 are not required to be the same material). The internal image display panel 511 is disposed on the internal side of the head-mounted image display device 1 (that is, the side of the device 1 housing that faces the user's face).

A virtual image optical unit 513 is disposed in front of the display screen of the internal image display panel 511. The virtual image optical unit 513 enlarges and projects the display image of the internal image display panel 511, which is viewed by the user as an enlarged virtual image. Meanwhile, the external image display panel 512 is disposed on the external side of the head-mounted image display device 1 (that is, the side of the device 1 housing on the opposite side of the internal side).

Figure 34:
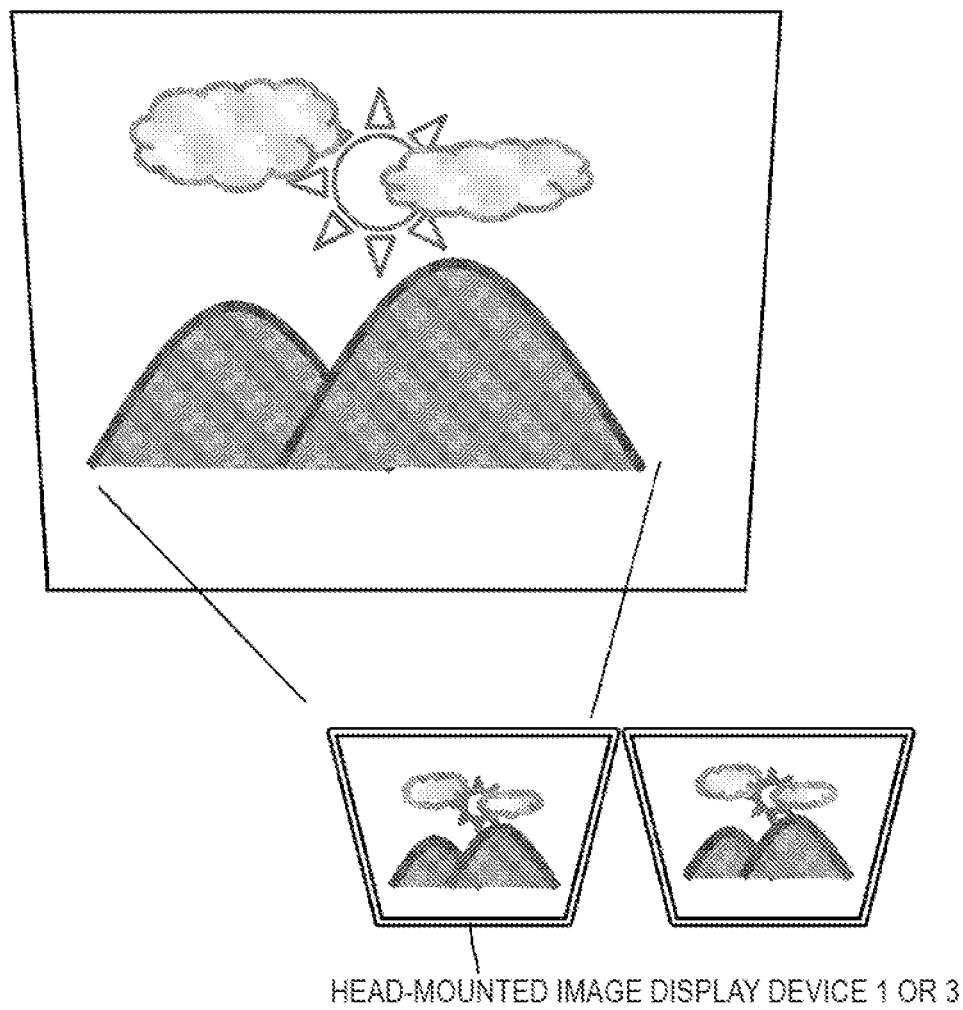
FIG. 34 is a diagram illustrating a display image of the head-mounted image display device 1 or 3 being projected onto a wall.

Optionally, a projection optical unit 514 may also be disposed in front of the display screen of the external image display panel 512. The projection optical unit 514 enlarges and projects a real image of the external image displayed on the external image display panel 512 onto a wall or the like (not illustrated) near the head-mounted image display device 1. In other words, the head-mounted image display device 1 may also be utilized as a compact projector. FIG. 34 illustrates a display image of the head-mounted image display device 1 being projected onto a wall (for the case in which the internal image and the external image are the same).

Note that in FIG. 5, only one internal image display panel 511 and virtual image optical unit 513 are illustrated for the sake of simplicity, but in the case in which the head-mounted image display device 1 is a binocular type, an internal image display panel 511 and a virtual image optical unit 513 are provided for each of the left and right eyes.

Figure 6:
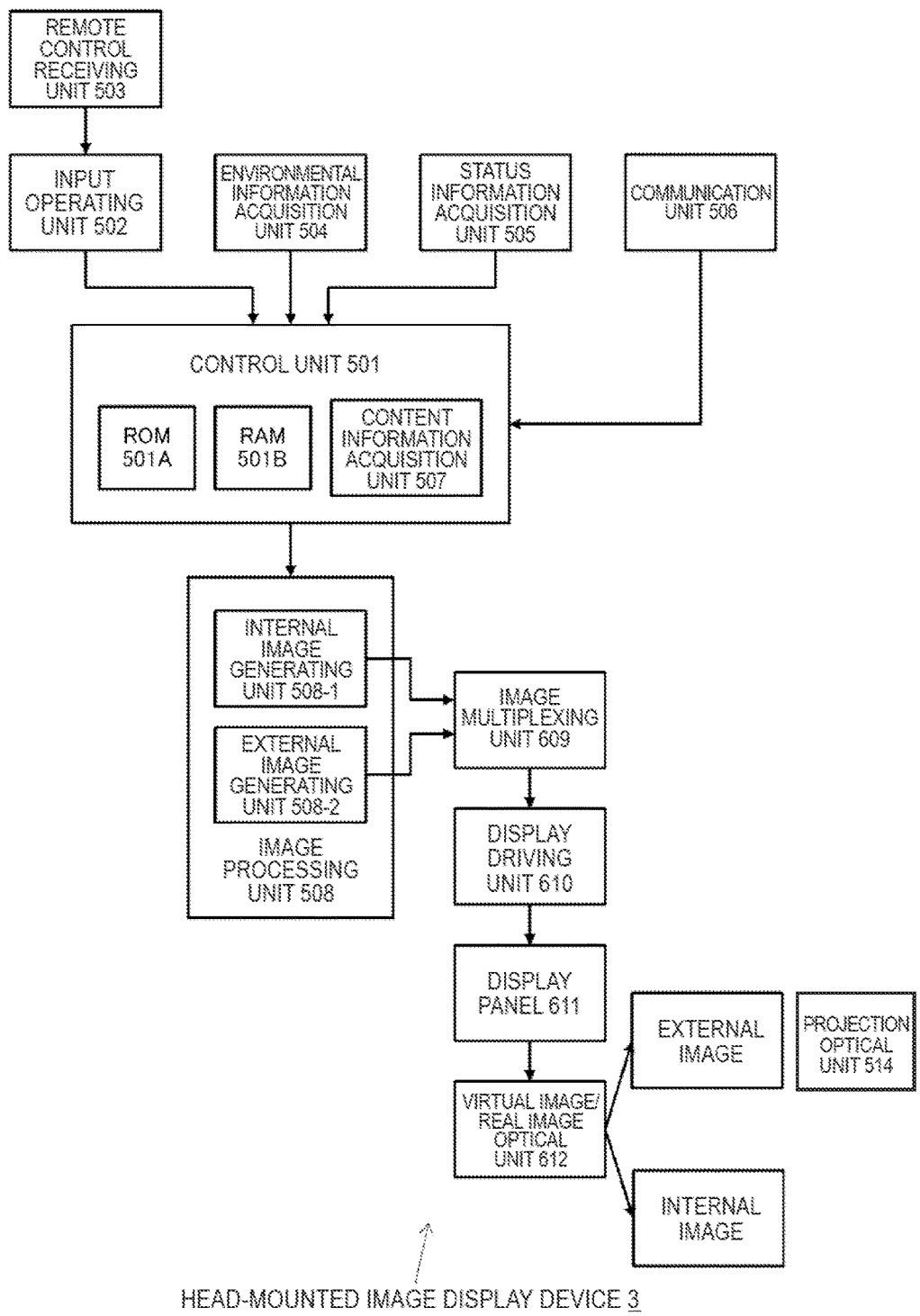
FIG. 6 is a diagram schematically illustrating a functional configuration of the head-mounted image display device 3 of the see-through type illustrated in FIGS. 3 and 4.

Also, FIG. 6 schematically illustrates a functional configuration of the head-mounted image display device 3 of the see-through type illustrated in FIGS. 3 and 4. As discussed earlier, the head-mounted image display device 3 is equipped with functions for respectively displaying an internal image seen from the side of the user wearing the relevant device 3, and an external image viewed from the outside of the relevant device. Functional elements similar to the head-mounted image display device 1 illustrated in FIG. 5 are denoted with the same reference numbers. The following will primarily describe functional elements that differ from the head-mounted image display device 1.

Figure 7:
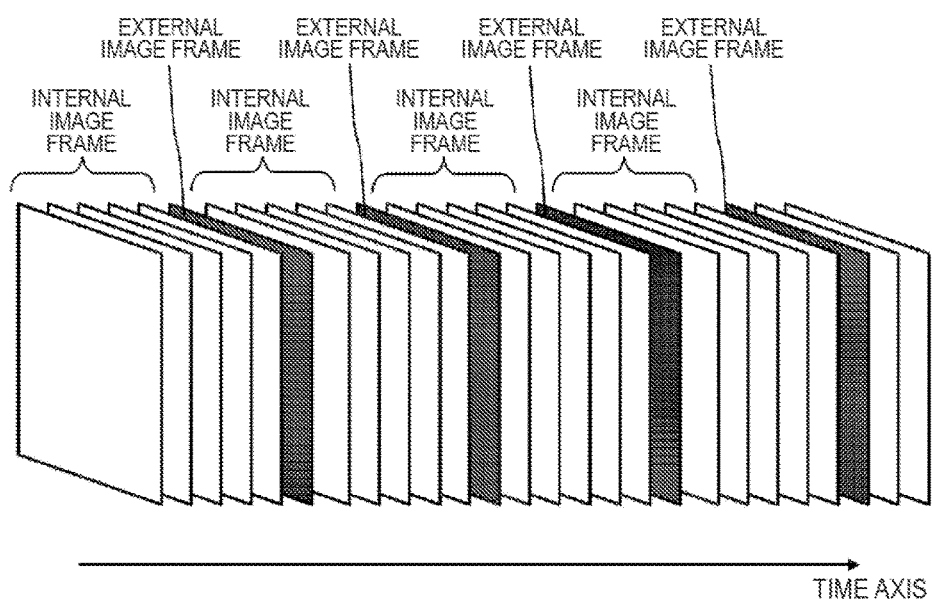
FIG. 7 is a diagram illustrating the display interval of an internal image and an external image.

The image multiplexing unit 609 multiplexes frames of the internal image and the external image respectively generated by the internal image generating unit 508-1 and the external image generating unit 508-2 for display by a single display panel 611. The multiplexing method is arbitrary, but the following will describe time-division multiplexing. For example, as illustrated in FIG. 7, the image multiplexing unit 609 inserts 1 external image frame for every N consecutive internal image frames on the time axis. The luminance ratio (or image definition) of the internal image and the external image in this case simply becomes N:1 (assuming that the luminance of each of the internal image and the external image at the time of output is the same). Herein, N is a positive integer equal to or greater than 1 (in the example illustrated in the drawing, N=4). As the value of N becomes larger, the external image that is ultimately displayed becomes a brighter, more well-defined image. However, in the case of externally displaying the same image as the internal image, the multiplexing process by the image multiplexing unit 609 is omitted.

As an image display system, the head-mounted image display device 3 of the transmissive, or in other words, see-through type is equipped with a display panel 611 that display a multiplexed internal image and external image, and a virtual image/real image optical unit 612 that accepts display light displayed by the display panel 611, separates the internal image and the external image, and guides an enlarged virtual image of the internal image to the viewer's pupils while guiding a real image of the external image to the outside.

The display panel 611 is made up of a micro-display such as an organic electroluminescence (EL) display, an inorganic EL display, or a liquid crystal display (LCD), for example. The following description supposes that a liquid crystal display that outputs image light made up of linearly-polarized light is implemented as the display panel 611. In addition, the display driving unit 610 sequentially selects the pixels of the display panel 611 every row and performs line-sequential scanning to supply a pixel signal based on the processed image signal.

The virtual image/real image optical unit 612 separates the multiplexed internal image and external image with an optical effect, for example, and forms a virtual image enlarging the internal image on the user's pupils while also forming a real image of the external image on an externally disposed screen (see FIG. 4).

Note that optionally, a projection optical unit 514 may also be disposed in front of the screen onto which the real image of the external image is projected. The projection optical unit 514 enlarges and projects a real image of the external image displayed on the external image display panel 512 onto a wall or the like (not illustrated) near the head-mounted image display device 1 (as above). In other words, the head-mounted image display device 3 may also be utilized as a compact projector (see FIG. 34).

Figure 8:
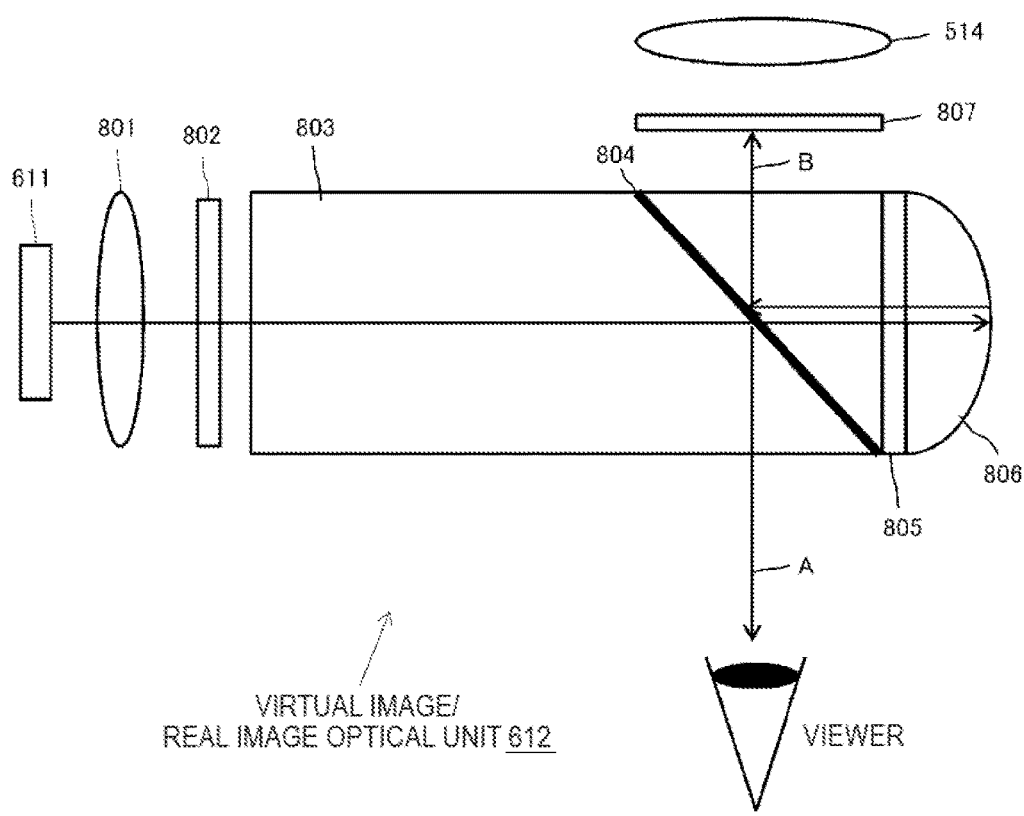
FIG. 8 is a diagram illustrating an exemplary configuration of a virtual image/real image optical unit 612.

B. Configuration of Optical System in See-Through Head-Mounted Image Display Device FIG. 8 illustrates an exemplary configuration of the virtual image/real image optical unit 612. The virtual image/real image optical unit 612 illustrated in the drawing is equipped with a collimating optical unit 801, a half-wave plate (HWP) 802, a waveguide 803, a polarization beam splitter (PBS) 804 and a quarter-wave plate 805 provided inside the waveguide 803, a concave mirror 806 formed on an edge face of the waveguide 803, and a screen 807 on which to project the external image.

The polarization beam splitter 804 is disposed tilted 45 degrees with respect to the optical axis of incident light from the display panel 611. Also, the quarter-wave plate 805 is disposed orthogonally to the optical axis of incident light from the display panel 611. In addition, the concave mirror 806 is formed on the edge face of the waveguide 803 on the opposite side from the incident side on which display light from the display panel 611 is incident.

Figure 9:
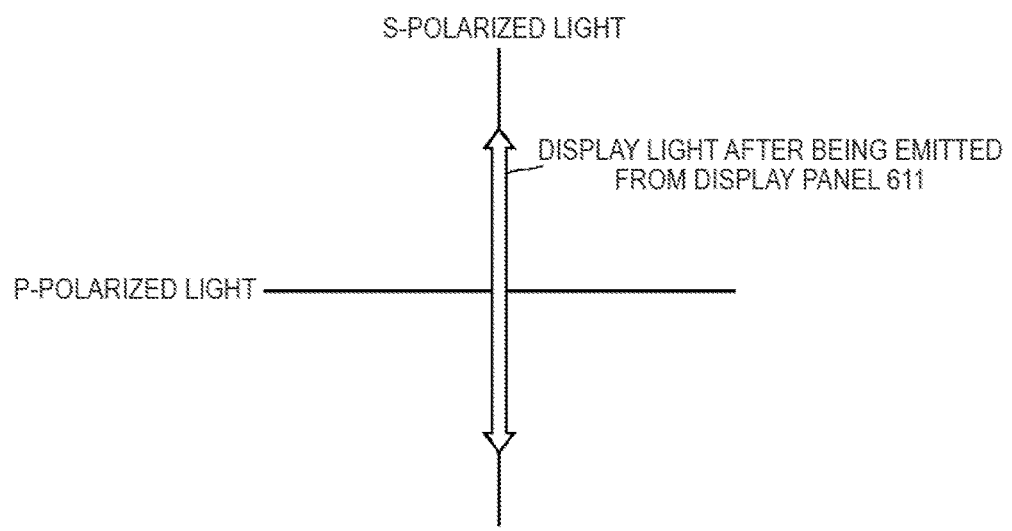
FIG. 9 is a diagram illustrating the polarization properties of display light immediately after being emitted from the display panel 611 in the virtual image/real image optical unit 612 illustrated in FIG. 8.

The collimating optical unit 801 is made up of a convex lens, for example, and is an optical unit that accepts light emitted from the pixels of the display panel 611 and works to form a group of parallel light beams. The display panel 611 is placed at a predetermined position of the focal length of the convex lens. The group of parallel light beams emitted from the collimating optical unit 801 are respectively incident on the waveguide 803 via the half-wave plate 802. The display light immediately after being emitted from the display panel 611 is made up of an s-polarized light component only (see FIG. 9).

The half-wave plate 802 is disposed between the display panel 611 and the polarization beam splitter 804. In the example illustrated in FIG. 8, display light emitted from the display panel 611 is incident on the half-wave plate 802 after becoming a group of parallel light beams via the collimating optical unit 801. The half-wave plate 802 used herein has a dynamically polarizable optical axis direction. One example of a half-wave plate 802 with a dynamically polarizable optical axis direction is an optical doubler made of ferroelectric crystal (for example, see Patent Literature 5).

Figure 10:
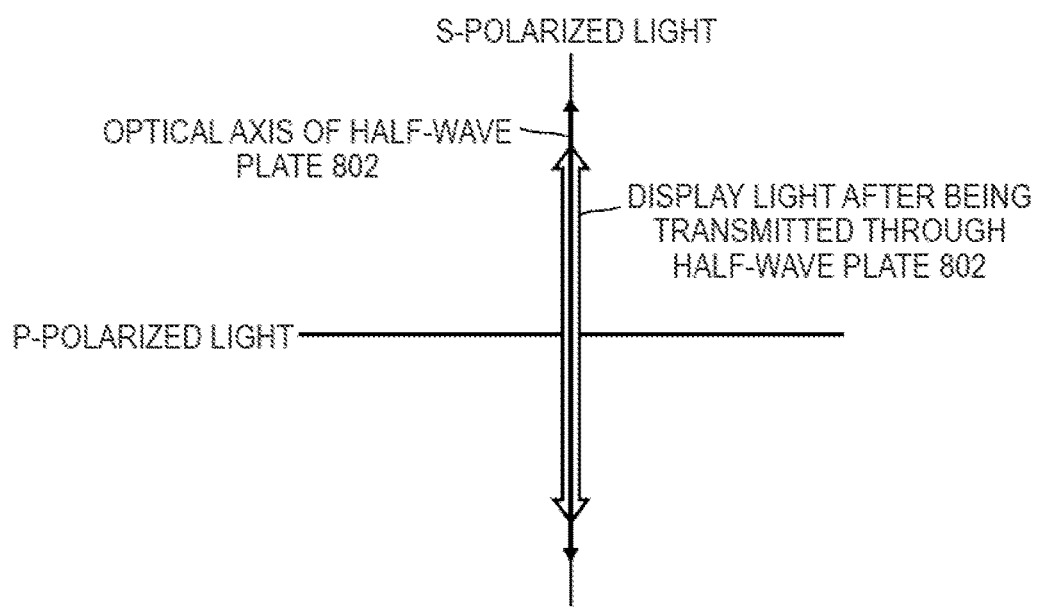
FIG. 10 is a diagram illustrating the polarization properties of display light transmitted through a half-wave plate 802 having an optical axis orientation set to 0 degrees in the virtual image/real image optical unit 612 illustrated in FIG. 8.

Herein, if the optical axis orientation of the half-wave plate 802 is set to 0 degrees, display light made of s-polarized light is transmitted through the half-wave plate 802 as-is (see FIG. 10). Also, if the optical axis orientation of the half-wave plate 802 is tilted by 45 degrees, display light converted to p-polarized light is transmitted through the half-wave plate 802 (see FIG. 11). Consequently, by changing the angle of the optical axis of the half-wave plate 802, the polarization of display light transmitted through the half-wave plate 802 may be alternated between s-polarized light and p-polarized light. In addition, by switching the period of configuring the angle of the optical axis of the half-wave plate 802, the duty of s-polarized light and p-polarized light transmitted through the half-wave plate 802 may be arbitrarily adjusted.

The waveguide 803 is made of a mostly transparent material. The group of parallel light beams made up of s-polarized light or p-polarized light after being transmitted through the half-wave plate 802 is incident on the edge face on one side of the waveguide 803, undergoes total internal reflection inside the waveguide 803, and propagates in the forward direction.

The polarization beam splitter 805 is disposed on the light path of the group of parallel light beams, tilted 45 degrees with respect to the optical axis of incident light from the display panel 611. The polarization beam splitter 804 has a property of transmitting p-polarized light while reflecting s-polarized light (as is commonly known). The alternation of the group of parallel light beams between s-polarized light and p-polarized light due to changing the angle of the optical axis of the half-wave plate 802 is as discussed earlier.

When the optical axis orientation of the half-wave plate 802 is set to 0 degrees and the transmitted light is s-polarized light, light reflects off the front side of the polarization beam splitter 804 (reflected light A in FIG. 8). This reflected light A, after being emitted from the internal side face of the waveguide 803, is viewed by the viewer's pupils as an enlarged virtual image of the display image of the display panel 611. Consequently, at the timings for displaying the internal image with the display panel 611, it is sufficient to set the optical axis orientation of the half-wave plate 802 to 0 degrees.

Figure 12:
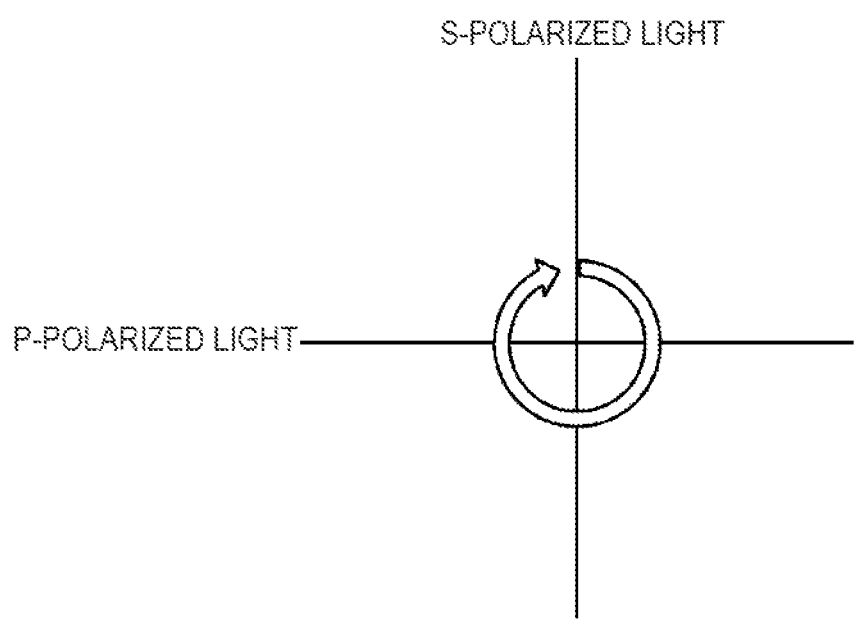
FIG. 12 is a diagram illustrating the polarization properties of display light transmitted through a polarization beam splitter 804 in the virtual image/real image optical unit 612 illustrated in FIG. 8.
Figure 13:
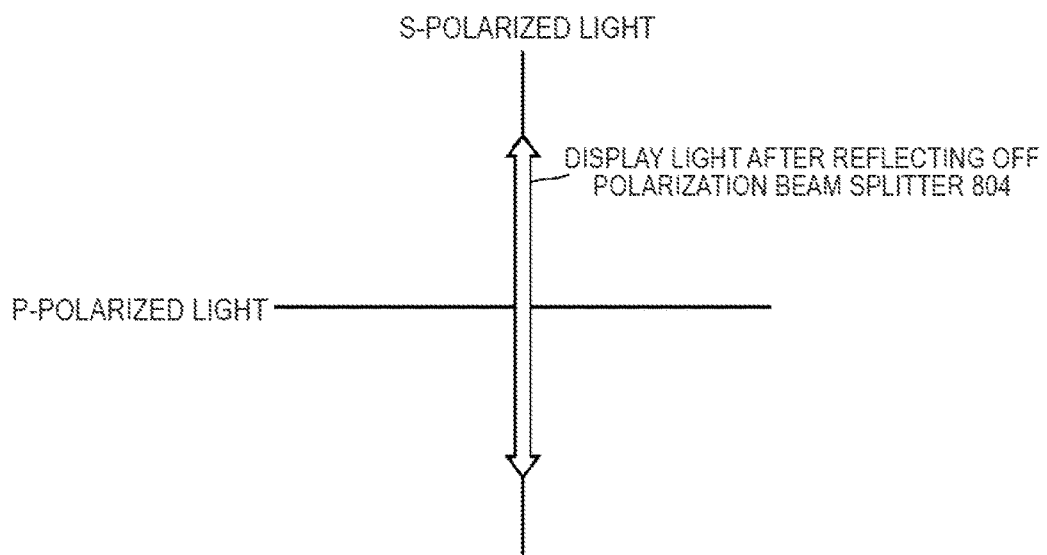
FIG. 13 is a diagram illustrating the polarization properties of display light transmitted through a polarization beam splitter 804 after being reflected and condensed by a concave mirror 806 in the virtual image/real image optical unit 612 illustrated in FIG. 8.

On the other hand, when the optical axis orientation of the half-wave plate 802 is tilted by 45 degrees and the transmitted light is p-polarized light, light is transmitted through the polarization beam splitter 804. The transmitted light is additionally converted to circularly polarized light temporarily by the downstream quarter-wave plate 805 (see FIG. 12). The circularly polarized light, after being reflected and condensed by the concave mirror 806 formed on the other edge face of the waveguide 803, is transmitted through the quarter-wave plate 805 again, and thereby converted into s-polarized light (see FIG. 13). The s-polarized light reflects off the back side of the polarization beam splitter 804 (reflected light B in FIG. 8), and travels to the side opposite the viewer's pupils, or in other words, the external side.

As illustrated in FIG. 8, on the side opposite the viewer's pupils, or in other words, on the external side, a screen 807 made of a scattering body is disposed. The s-polarized light B reflecting off the back side of the polarization beam splitter 804, after being emitted from the external side face of the waveguide 803, is projected onto the screen 807, and a real image of the display image of the display panel 611 is projected and displayed. Consequently, at the timings for displaying the external image with the display panel 611, it is sufficient to set the optical axis orientation of the half-wave plate 802 to a tilt of 45 degrees.

To ensure high luminance of the external image projected onto the screen 807, the reflectance of the polarization beam splitter 804 is raised, preferably to a reflectance of 90% or greater. In addition, the size of the screen 807 is not very large, preferably 2 in or less. Furthermore, the gain of the screen 807 is raised, preferably a gain of 2 or greater (provided that 1 is the gain during perfect diffusion, configuring a diffusion property so that the front luminance is double or more compared to a gain of 1).

For the screen 807, polymer dispersed liquid crystals (PDLCs) may be used. With PDLCs, light may be scattered by inducing an irregular state in an array of liquid crystal molecules by the action of a polymer network according to an applied voltage. Consequently, it is sufficient to produce the scattering effect of the screen 807 only when displaying the external image with the display panel 611 while also converting the display light into p-polarized light with the half-wave plate 802 and projecting the real image for display. On the other hand, when displaying the internal image with the display panel 611 while causing the display light to be transmitted directly as s-polarized light with the half-wave plate 802 to project the display light onto the viewer's pupils as an enlarged virtual image of the display panel 611, the scattering effect of the screen 807 may be inhibited, thereby taking advantage of the transmissive, or in other words, see-through property of the head-mounted image display device 3.

Alternatively, a hologram screen may be used as the screen 807. A hologram screen is a structure of an interference pattern laminated onto a resin film, and has a property of diffracting light of a specific wavelength while being transparent to light of other wavelengths. Consequently, it is sufficient to output the display image of the display panel 611 at the specific wavelength only when displaying the external image with the display panel 611 while also converting the display light into p-polarized light with the half-wave plate 802 and projecting the real image for display. On the other hand, when displaying the internal image with the display panel 611 while causing the display light to be transmitted directly as s-polarized light with the half-wave plate 802 to project the display light onto the viewer's pupils as an enlarged virtual image of the display panel 611, the display image of the display panel 611 may be output at a wavelength other than the specific wavelength, thereby preserving the transparency of the screen 807, and taking advantage of the transmissive, or in other words, see-through property of the head-mounted image display device 3.

Note that optionally, a projection optical unit 514 may also be disposed in front of the screen 807. The projection optical unit 514 enlarges and projects a real image of the external image displayed on the display panel 611 onto a wall or the like near the head-mounted image display device 3 (see FIG. 34). In other words, the head-mounted image display device 3 may also be utilized as a compact projector (as discussed earlier).

According to the exemplary configuration illustrated in FIG. 8, when the optical axis orientation of the half-wave plate 802 is set to 0 degrees, an enlarged virtual image of the display image of the display panel 611 is viewed by the viewer. On the other hand, when the optical axis orientation of the half-wave plate 802 is tilted by 45 degrees, a real image of the display image of the display panel 611 is projected onto the screen 807. Consequently, by alternating frames of the internal image and the external image with the display panel 611 in synchronization with the change in the angle of the optical axis of the half-wave plate 802, it is possible to output the internal image as an enlarged virtual image onto the viewer's pupils, while also outputting the external image as a real image onto the screen 807. In other words, it is sufficient to display the internal image with the display panel 611 in synchronization with the period of setting the optical axis orientation of the half-wave plate 802 to 0 degrees, and also display the external image with the display panel 611 in synchronization with the period of tilting the optical axis orientation of the half-wave plate 802 by 45 degrees.

Figure 14:
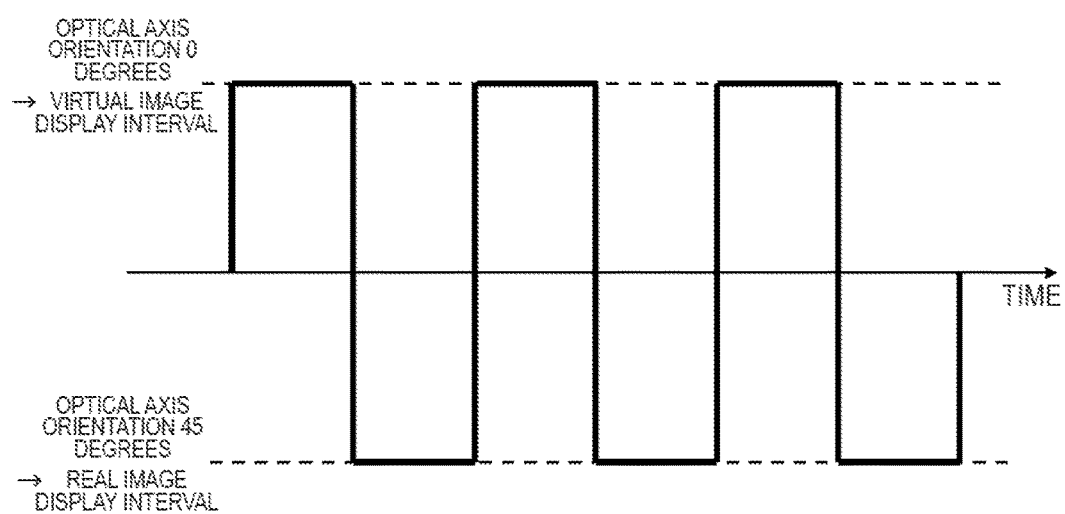
FIG. 14 is a diagram illustrating exemplary operation of the optical axis orientation of the half-wave plate 802.

FIG. 14 illustrates exemplary operation of the optical axis orientation of the half-wave plate 802. In this drawing, an internal of setting the optical axis orientation of the half-wave plate 802 to 0 degrees alternates with an internal of setting the optical axis orientation to 45 degrees.

The interval of setting the optical axis orientation of the half-wave plate 802 to 0 degrees becomes a virtual image display interval in which s-polarized light emitted from the display panel 611 enters the half-wave plate 802 and an enlarged virtual image of the display image of the display panel 611 is viewed by the viewer. Consequently, it is sufficient to display the internal image with the display panel 611 in synchronization with the virtual image display interval.

The interval of setting the optical axis orientation of the half-wave plate 802 to 45 degrees becomes a real image display interval in which p-polarized light emitted from the display panel 611 enters the half-wave plate 802 and a real image of the display image of the display panel 611 is projected onto the screen 807. Consequently, it is sufficient to display the external image with the display panel 611 in synchronization with the real image display interval.

Figure 15:
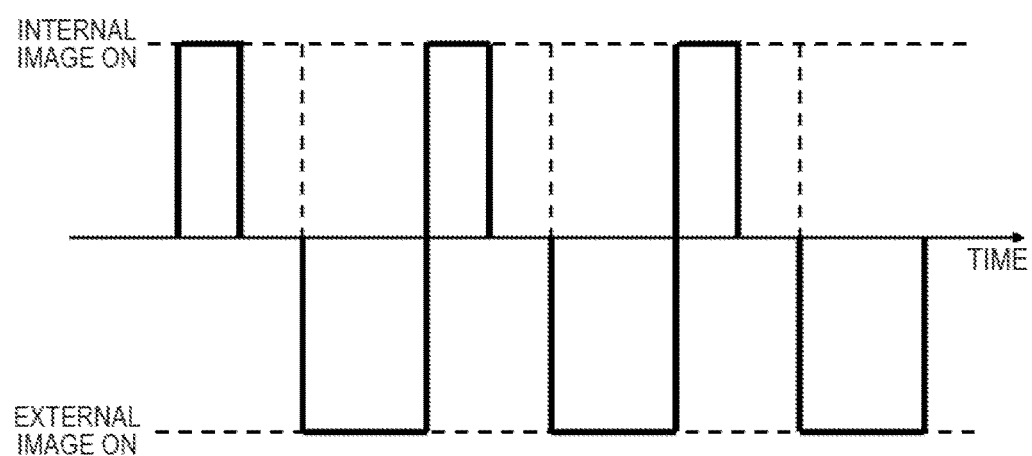
FIG. 15 is a diagram illustrating exemplary display operation of the display panel 611 synchronized with the operation of the optical axis orientation of the half-wave plate 802.

Additionally, although the display panel 611 should display the internal image in the virtual image display interval of setting the optical axis orientation of the half-wave plate 802 to 0 degrees, it is not necessary to keep the image on throughout the entire interval. FIG. 15 illustrates exemplary display operation of the display panel 611 synchronized with the operation of the optical axis orientation of the half-wavelength plate 802. In the example illustrated in the drawing, the display panel 611 keeps the virtual, or in other words, internal image on for only part of the virtual image display interval. The luminance of the enlarged virtual image that the viewer views may be adjusted by the ratio of the on-time of the image in the virtual image display interval. On the other hand, since the external image is a projected image projected on the screen 807 and the luminance is comparatively low, having the display panel 611 keep the image on throughout the entire real image display interval is thought to be preferable.

Figure 11:
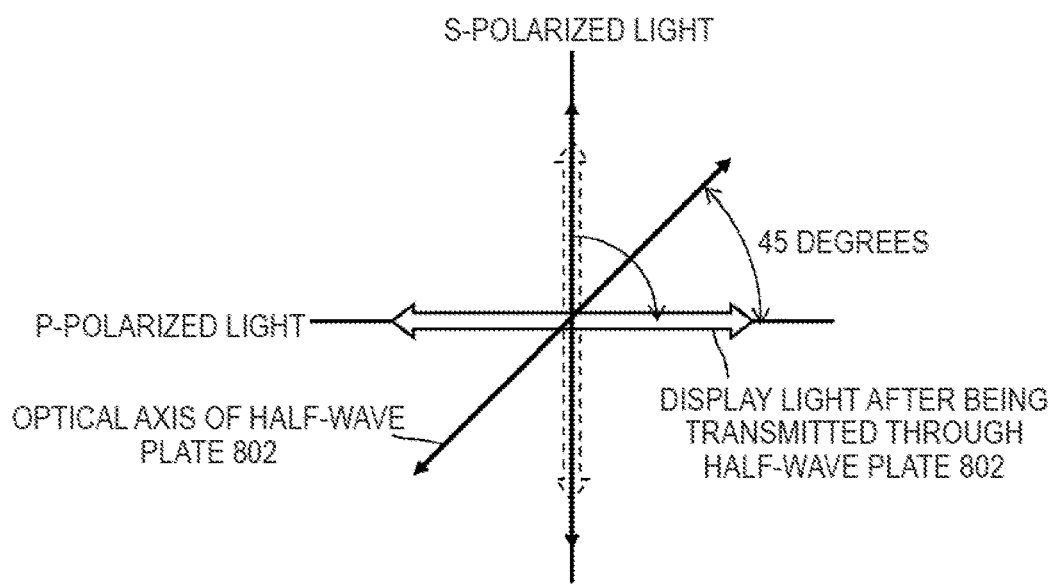
FIG. 11 is a diagram illustrating the polarization properties of display light transmitted through a half-wave plate 802 having an optical axis orientation tilted to 45 degrees in the virtual image/real image optical unit 612 illustrated in FIG. 8.
Figure 16:
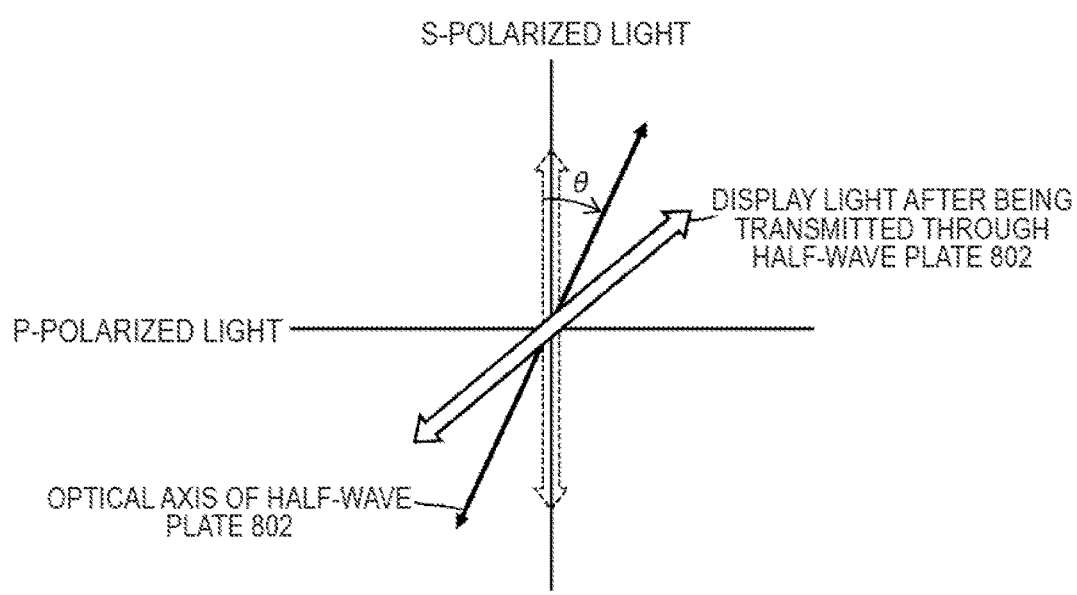
FIG. 16 is a diagram illustrating the optical axis orientation of the half-wave plate 802 set to an angle θ intermediate between 0 degrees and 45 degrees.

The foregoing has described an example of alternately displaying the internal image and the external image via time division by switching the optical axis orientation of the half-wave plate 802 between the two stages of 0 degrees and 45 degrees, as illustrated in FIGS. 10 and 11. In contrast, by setting the optical axis orientation of the half-wave plate 802 to an intermediate angle θ between 0 degrees and 45 degrees (see FIG. 16), the ratio of the s-polarized light component and the p-polarized light component of the emitted light may be adjusted. To change the optical axis orientation of the half-wave plate 802, it is sufficient to physically rotate the half-wave plate 802 itself.

Figure 17:
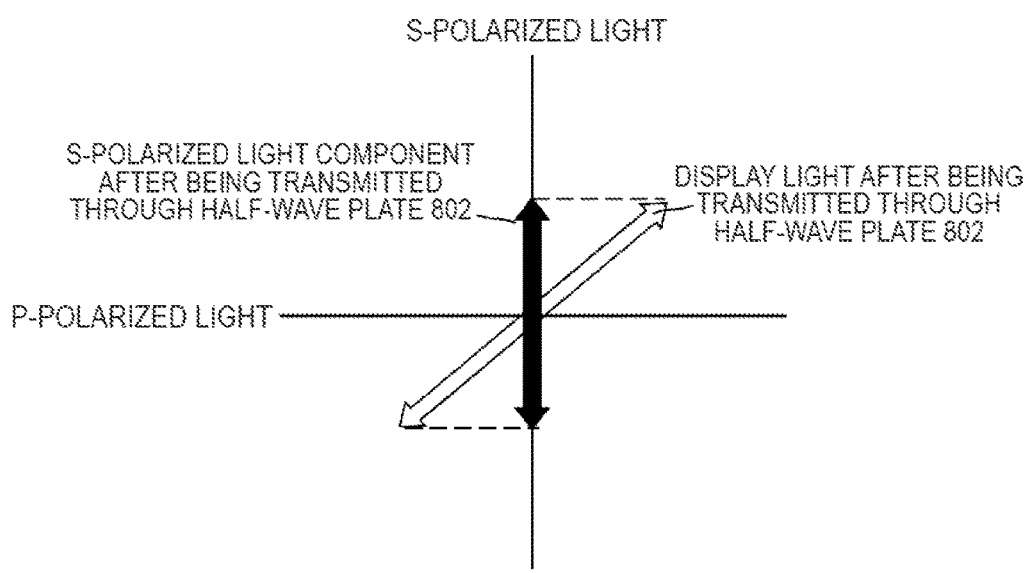
FIG. 17 is a diagram illustrating the s-polarized light component emitted when the optical axis orientation of the half-wave plate 802 is set to the angle θ.
Figure 18:
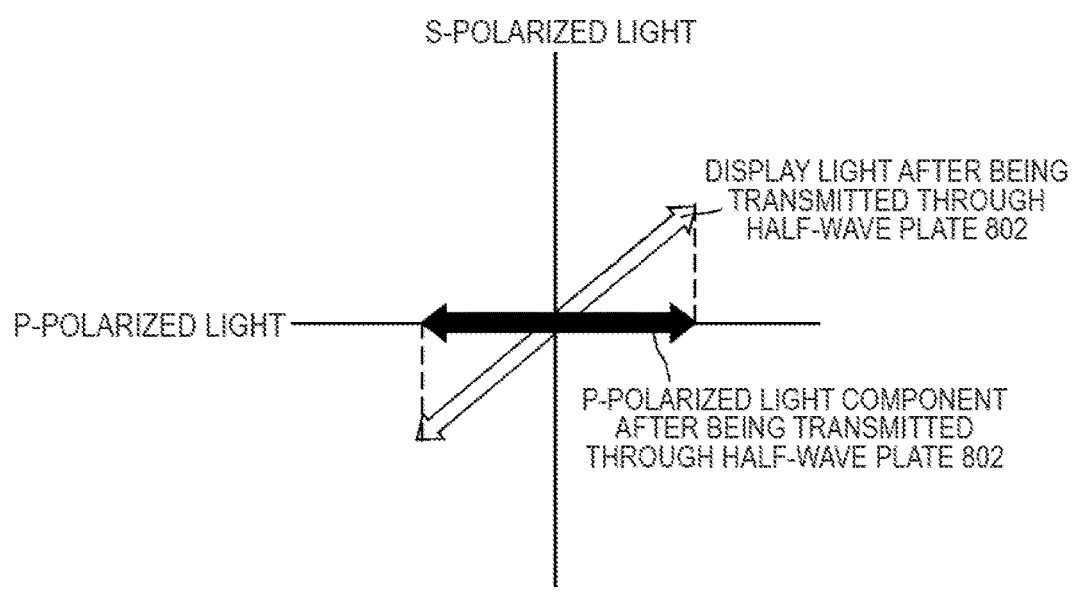
FIG. 18 is a diagram illustrating the p-polarized light component emitted when the optical axis orientation of the half-wave plate 802 is set to the angle θ.
Figure 19:
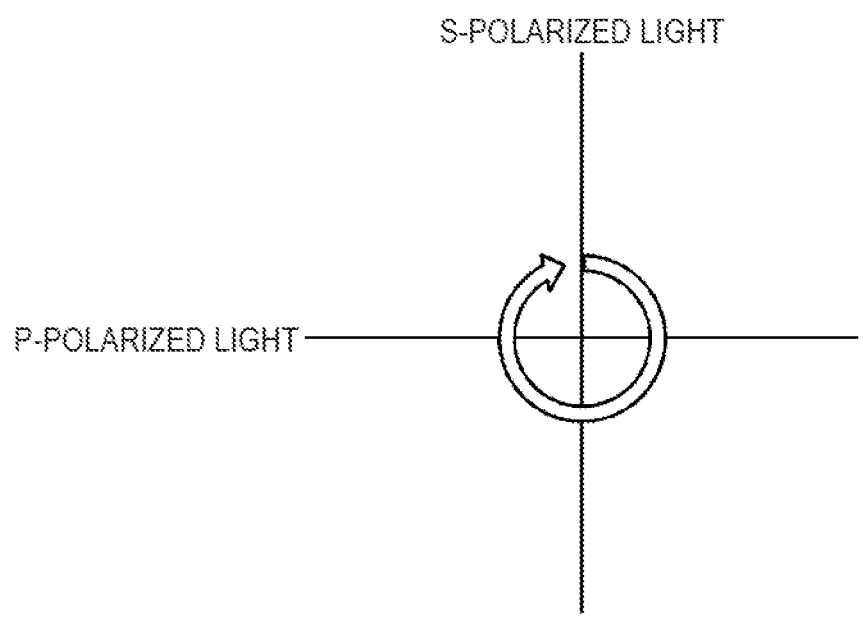
FIG. 19 is a diagram illustrating how the p-polarized light component illustrated in FIG. 18 is transmitted through a quarter-wave plate 805 and converted into circularly polarized light.
Figure 20:
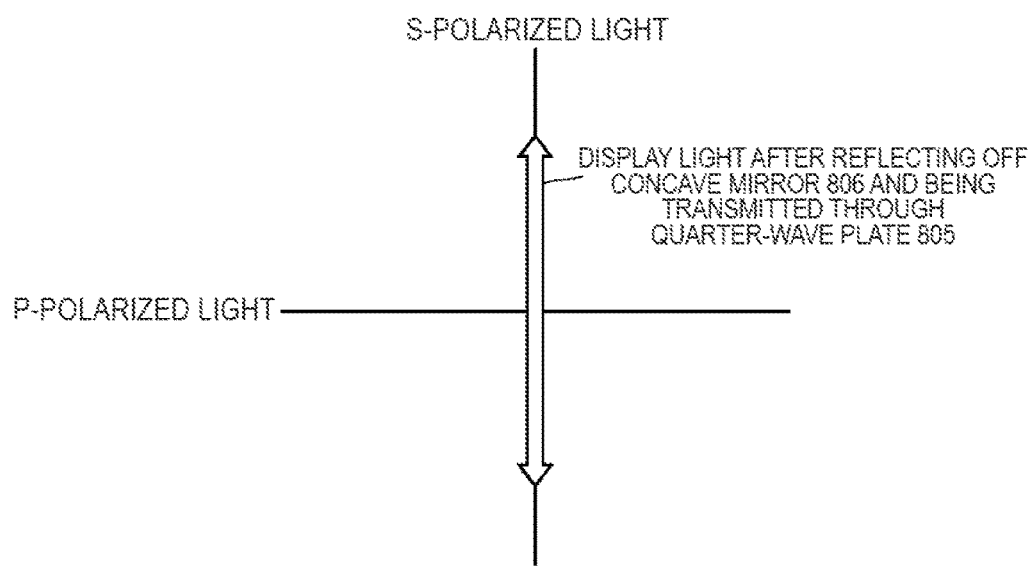
FIG. 20 is a diagram illustrating how the circularly polarized light illustrated in FIG. 19 is transmitted through the quarter-wave plate 805 and converted into s-polarized light.

The s-polarized light component after being transmitted through the half-wave plate 802 (see FIG. 17) reflects off the front side of the polarization beam splitter 804 (the reflected light A in FIG. 8), and is viewed by the viewer as an enlarged virtual image of the display image of the display panel 611. Also, the p-polarized light component after being transmitted through the half-wave plate 802 (see FIG. 18) is transmitted through the polarization beam splitter 804, and after being temporarily converted to circularly polarized light by the downstream quarter-wave plate 805 (see FIG. 19), reflects off the concave mirror 806, is transmitted through the quarter-wave plate 805 and thereby converted to s-polarized light (see FIG. 20), reflects off the back side of the polarization beam splitter 804 (the reflected light B in FIG. 8), and is projected onto the screen 807 as the external image.

For example, when setting the optical axis orientation of the half-wave plate 802 to θ, the ratio of the s-polarized light component and the p-polarized light component, or in other words, the luminance ratio of the internal image and the external image becomes $\cos^2 \theta : \sin^2 \theta$. When displaying the same external image as the internal image, the luminance of the external image may be adjusted by changing the optical axis orientation θ of the half-wave plate 802.

With the exemplary configuration of the virtual image/real image optical unit 612 illustrated in FIG. 8, the multiplexed internal image and external image are separated, and thus an external image that is different from the internal image may be presented. In contrast, if presenting an external image shared in common with the internal image, the configuration of the virtual image/real image optical unit 612 may be simplified.

Figure 21:
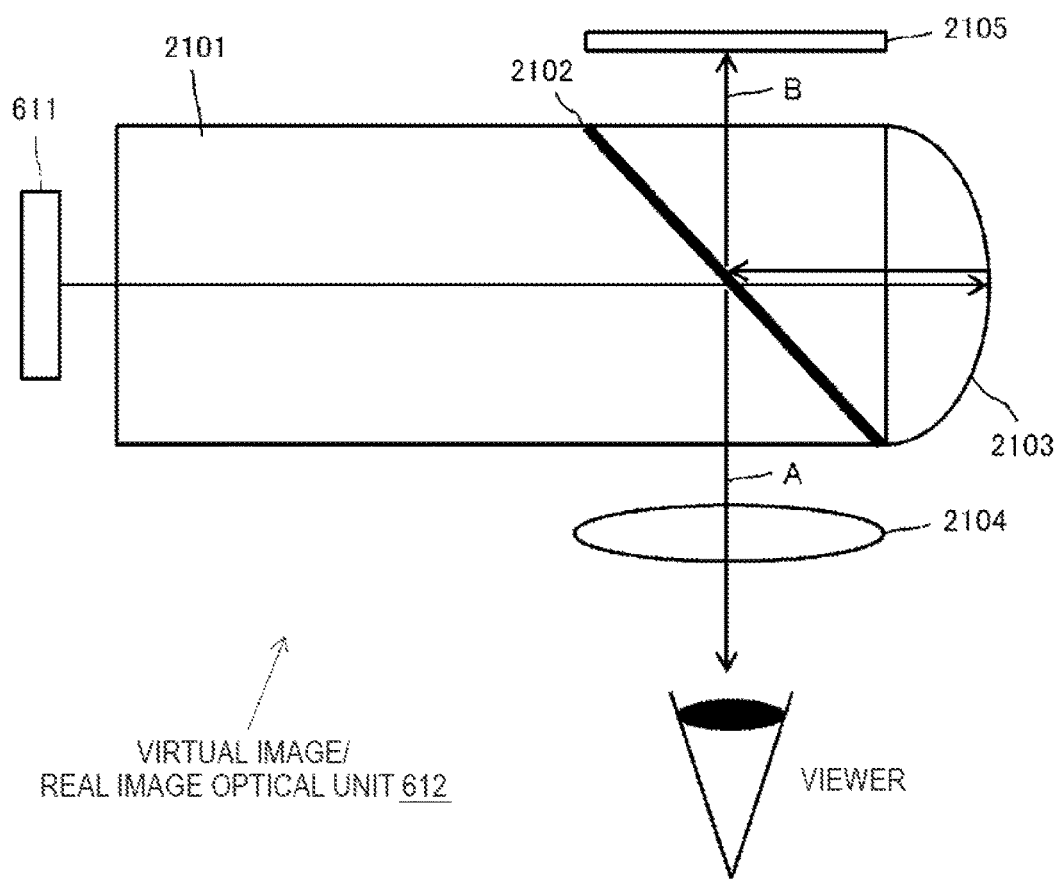
FIG. 21 is a diagram illustrating another exemplary configuration of a virtual image/real image optical unit 612.

FIG. 21 illustrates another exemplary configuration of the virtual image/real image optical unit 612. The virtual image/real image optical unit 612 illustrated in the drawing is equipped with a waveguide 2101, a half-silvered mirror 2102 disposed inside the waveguide, a concave mirror 2103 formed on an edge face of the waveguide 2101, a collimating optical unit 2104 that forms the internal image, and a screen 2105 onto which the external image is projected.

Display light emitted from the display panel 611 enters one edge face of the waveguide 2101. The half-silvered mirror 2102 is disposed tilted 45 degrees with respect to the optical axis of the incident light from the display panel 611, and reflects part of the incident display light while transmitting another part. The reflected light and the transmitted light are nearly equal in intensity, but may be adjusted so that the reflected light is greater in intensity, for example.

The display light reflecting off the front side of the half-silvered mirror 2102 (the reflected light A in FIG. 21), after being emitted from the internal side face of the waveguide 2101, is condensed by the collimating optical unit 2104, and viewed by the viewer's pupils as an enlarged virtual image of the display image of the display panel 611.

Meanwhile, the light transmitted through the half-silvered mirror 2102, after being reflected and condensed by the concave mirror 2103 formed on the other edge face of the waveguide 2101, reflects off the back side of the half-silvered mirror 2102 (the reflected light B in FIG. 21). The s-polarized light B reflecting off the back side of the polarization beam splitter 804 is projected onto the screen 2105 after being emitted from the external side face of the waveguide 2101, and a real image of the display image of the display panel 611 is projected and displayed.

To ensure high luminance of the external image projected onto the screen 2105, the reflectance of the half-silvered mirror 2102 is raised, preferably to a reflectance of 90% or greater. In addition, the size of the screen 2105 is not very large, preferably 2 in or less. Furthermore, the gain of the screen 2105 is raised, preferably a gain of 2 or greater (provided that 1 is the gain during perfect diffusion, configuring a diffusion property so that the front luminance is double or more compared to a gain of 1).

Figure 22:
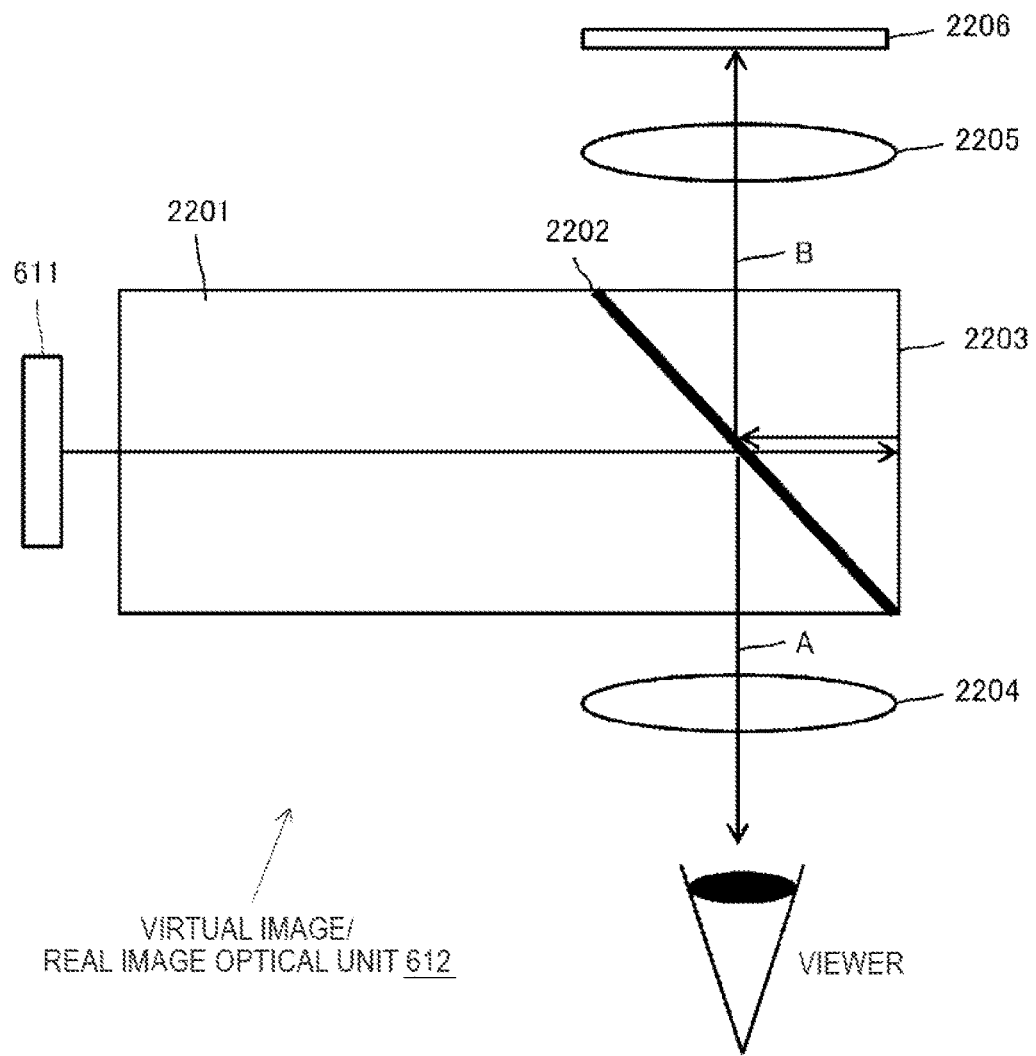
FIG. 22 is a diagram illustrating another exemplary configuration of a virtual image/real image optical unit 612.

Also, FIG. 22 illustrates another exemplary configuration of the virtual image/real image optical unit 612. The virtual image/real image optical unit 612 illustrated in the drawing is equipped with a waveguide 2201, a half-silvered mirror 2202 disposed inside the waveguide 2201, a plane mirror 2203 formed on an edge face of the waveguide 2201, a collimating optical unit 2204 that forms the internal image, and a projection optical unit 2205 and a screen 2206 for projecting the external image.

Display light emitted from the display panel 611 enters one edge face of the waveguide 2201. The half-silvered mirror 2202 is disposed tilted 45 degrees with respect to the optical axis of the incident light from the display panel 611, and reflects part of the incident display light while transmitting another part (as above). The reflected light and the transmitted light are nearly equal in intensity, but may be adjusted so that the reflected light is greater in intensity, for example.

The display light reflecting off the front side of the half-silvered mirror 2202 (the reflected light A in FIG. 22), after being emitted from the internal side face of the waveguide 2201, is condensed by the collimating optical unit 2204, and viewed by the viewer's pupils as an enlarged virtual image of the display image of the display panel 611.

Meanwhile, the light transmitted through the half-silvered mirror 2202, after being totally reflected by the plane mirror 2203 formed on the other edge face of the waveguide 2201, additionally reflects off the back side of the half-silvered mirror 2202, and is emitted from the external side face of the waveguide 2201 (the reflected light B in FIG. 22). The reflected light B is enlarged and projected onto the screen 2206 by the projection optical unit 2205, and a projected image of the display image is displayed.

To ensure high luminance of the external image projected onto the screen 2206, it is preferable to raise the reflectance of the half-silvered mirror 2202, while also not making the size of the screen 2206 very large, and raising the gain of the screen 2206 (as above).

C. External Image Display in Head-Mounted Image Display Device

It can be argued that a head-mounted image display device is an ultimate personal display. However, since head-mounted image display devices of the related art are not equipped with means to transmit information to the outside, nearby people are unable to receive information of some kind from the wearing user. In addition, the user him- or herself is unable to communicate information to the outside unless the user removes the device and interrupts the viewing of content.

In contrast, the head-mounted image display device 1 and 3 according to the present embodiment are equipped with functions for displaying an internal image seen from the side of the user wearing the relevant device, as well as an external image seen from the outside of the relevant device. Consequently, via the external image, nearby people are able to know the status of the user, what the user is doing, what the user is viewing, or the degree to which the user is concentrating on or immersed in viewing. In addition, via the external image, the user him- or herself is able to communicate information related to the user's own status or the content that the user is viewing, while still wearing the device (in other words, while continuing to view the content).

C-1. Image Control According to User Operations

As discussed earlier, the control unit 501, in response to an instruction from the user given via the input operating unit 502, controls the turning on/off of the external image, the display method (such as the size, brightness, contrast, color tint, display position, and continuous display or intermittent display of the display image), and the information to display. In addition, the control unit 501 controls an external image linked or associated with the content displayed as the internal image in response to an instruction from the user. Examples of external image and internal image display control methods according to instructions from the user are summarized in Table 1 below.

TABLE 1

Control of external/internal picture based on user operations

| Detection target | Detection method | Picture control method |
|---|---|---|
| Instruction to output external picture | Input operating unit, remote control | Internal/external picture on/off<br>External display of internal picture<br>External display of converted picture of internal picture<br>External display of status<br>Change display area, display size |
| Instruction to externally display internal picture | Input operating unit, remote control | External display of internal picture |
| Instruction to lock operations | Input operating unit, remote control | Lock operations from inside/outside |

Figure 23:
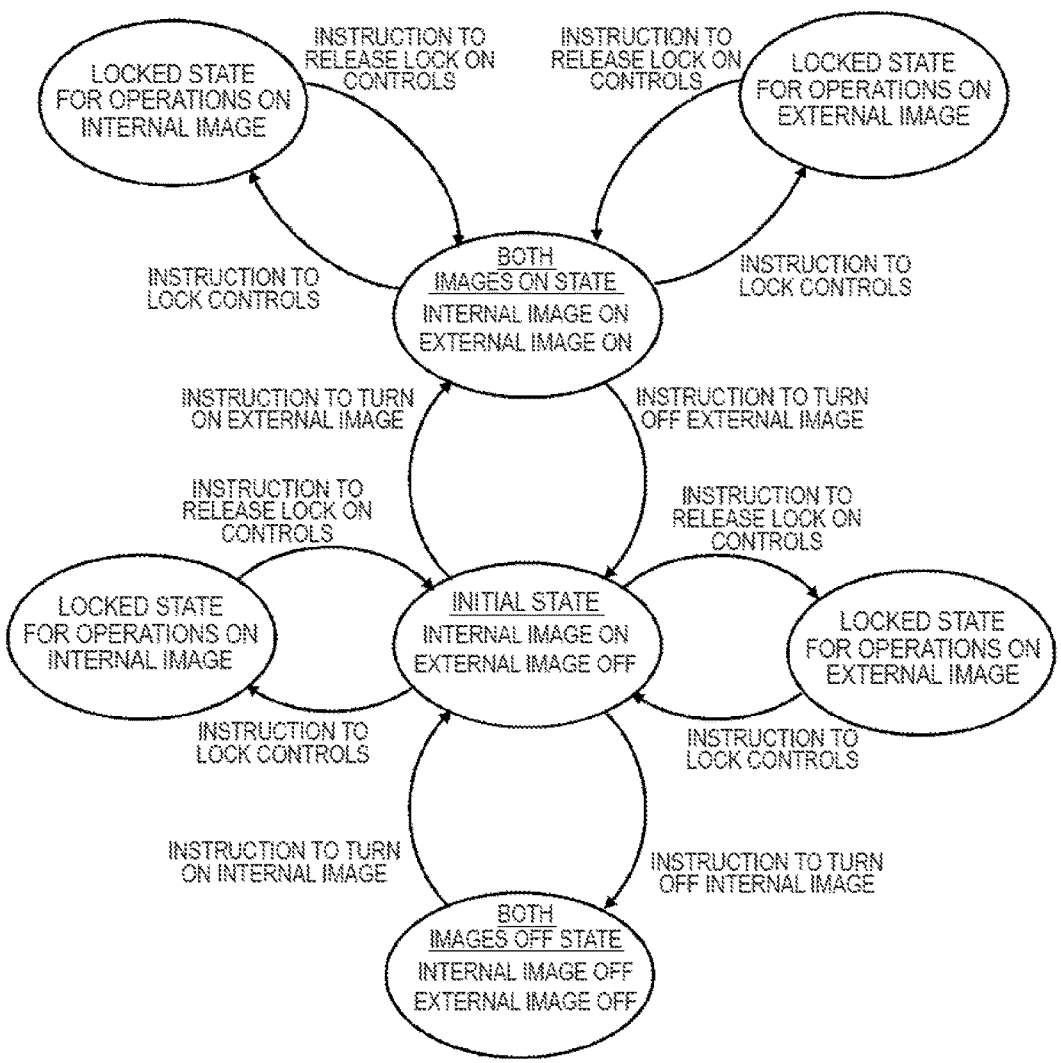
FIG. 23 is a state transition diagram illustrating exemplary operation of the head-mounted image display device 1 or 3 according to an instruction from a user via an input operating unit 502.

FIG. 23 illustrates exemplary operation of the head-mounted image display device 1 or 3 according to an instruction from a user via the input operating unit 502, in the form of a state transition diagram.

In the Initial state, the head-mounted image display device 1 or 3 turns on the internal image and turns off the external image. At this point, if an instruction to display the external image is given via the input operating unit 502, the external image is turned on, and the state transitions to the Both Images On state. Also, if an instruction to turn off the display of the external image is given while in the Both Images On state, the external image is turned off, and the state returns to the Initial state.

Note that, although omitted from illustration in FIG. 23, if an instruction to turn off the display of the internal image is given while in the Both Images On state, the internal image is turned off, and the state transitions to the Only External Image On state.

In the Both Images On state, in response to an additional instruction from the user via the input operating unit 502, control such as control to change the image displayed as the external image or the internal image, adjusting color in the external image and the internal image, controlling the brightness of the external image and the internal image, changing the display size of the external image, or moving the display area of the external image (such as full-screen display, display on only the left or right side, or display using part of the screen) is conducted.

Also, in the Initial state, if an instruction to turn off the display of the internal image is given via the input operating unit 502, the internal image is turned off, and the state transitions to the Both Images Off state. Also, if an instruction to turn on the display of the internal image is given while in the Both Images Off state, the internal image is turned on, and the state returns to the Initial state.

In the Both Images On State and the Only External Image On state in which the external image is turned on, the same image as the internal image or an external-only image that differs from the internal image is displayed (for example, when the user wants to conceal or camouflage the internal image currently being viewed from nearby people, replacement image content is displayed as the external image). Also, information about the nearby environment acquired by environmental sensors (discussed earlier) or the user's status acquired by status sensors (discussed earlier) may be displayed as the external image. Furthermore, in response to an instruction from the user given via the input operating unit 502 (including blink operations and eyeball movement detected with a myoelectric sensor or oculo-electric sensor), the information to display as the external image may be changed (like a slideshow, for example). In addition, in response to an instruction from the user given via the input operating unit 502, the external image may also be displayed internally, enabling the wearing user to visually check the external image.

In the Both Images On state and the Only External Image On state in which the external image is turned on, it is not strictly necessary to always (that is, continuously) display the external image. An intermittent display, or a timer display that displays at predetermined times may also be conducted. The control unit 501 may also cause any of a continuous display, an intermittent display, or a timer display to be conducted in response to an instruction from the user given via the input operating unit 502.

In the Initial state or the Both Images On state in which the internal image is turned on, the state transitions to a Locked state that locks user input operations on the internal image in response to an input operation that gives an instruction to lock input operations, and additionally releases the lock on user input operations on the internal image in response to an input operation that gives an instruction to release the lock. Also, in the Both-eye Images On state in which the external image is turned on, the state transitions to a Locked state that locks user input operations on the external image in response to an input operation that gives an instruction to lock input operations, and additionally releases the lock on user input operations on the external image in response to an input operation that gives an instruction to release the lock.

C-2. Image Control According to Surrounding Environment

The control unit 501 controls display operation for displaying an internal image seen from the side of the user wearing the relevant device 1 or 3 and an external image seen from the outside of the relevant device according to environmental information acquired by the environmental information acquisition unit 504. Examples of external image and internal image display control methods according to environmental information are summarized in Table 2 below.

TABLE 2

Control of external/internal picture based on external environment

| Detection target | Detection method | Picture control method |
|---|---|---|
| Environmental light intensity | Light sensor | Brightness control of external/internal picture |
| Acoustic intensity | Microphone | Secrecy level, brightness control of external picture |
| Position/location | GPS | Brightness control of external/internal picture |
| Temperature | Temperature sensor | Color control of external/internal picture |
| Weather | Camera, Internet | Brightness control of external/internal picture |
| Time | Internal clock | Intermittent display control of external picture |
| Ambient picture | Camera | External picture on/off, change display area, display size |
| Number of people | Camera | Secrecy level, brightness control of external picture |

Figure 24:
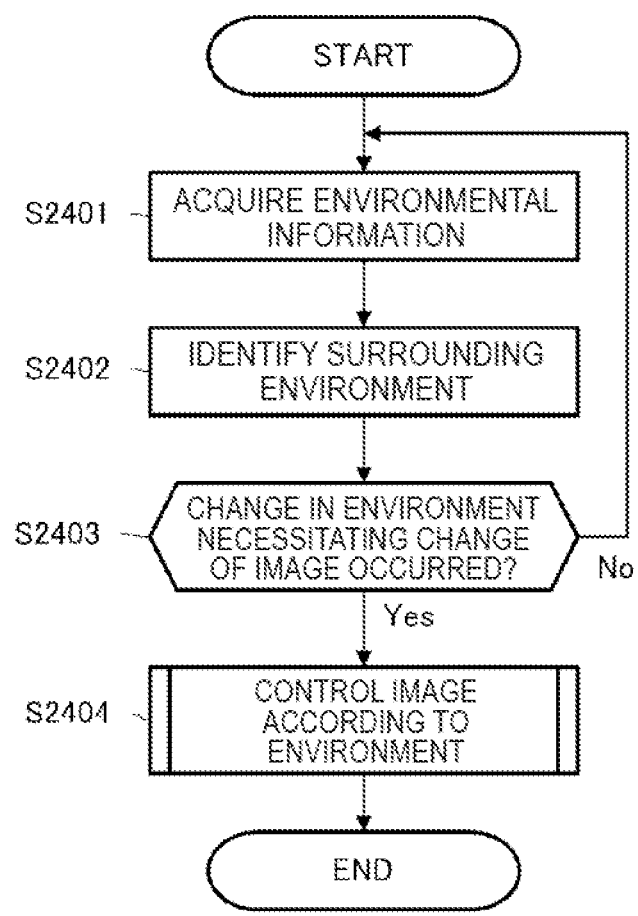
FIG. 24 is a flowchart illustrating exemplary operation of the head-mounted image display device 1 or 3 according to environmental information.

FIG. 24 illustrates exemplary operation of the head-mounted image display device 1 or 3 according to environmental information, in the form of a flowchart. The processing operations illustrated in the drawing are activated periodically, for example.

First, the environmental information acquisition unit 504 acquires output information from various environmental sensors (discussed earlier) as environmental information (step S2401). Subsequently, the control unit 501 analyzes the acquired environmental information (step S2402), identifies the surrounding environment, and checks whether or not a change in the environment necessitating a change of the internal image or the external image has occurred (step S2403).

Subsequently, when a change in the environment necessitating a change of the internal image or the external image occurs (step S2403, Yes), the control unit 501 controls the display of the external image according to the current environment (step S2404).

For example, when a change in environmental lighting is detected from the environmental information acquisition unit 504, when movement from outdoors to indoors (or from indoors to outdoors) is detected on the basis of position information or a captured image from a camera, or when it is determined to be daytime or after sunset according to the current time measured by a clock, the control unit 501 adjusts the brightness level of the external image to suit the current surrounding environment.

In addition, the control unit 501 may also conduct an intermittent display or timer display of the external image according to the current time measured by a clock.

Also, on the basis of a recognition result of a captured image from an ambient camera, the control unit 501 determines whether or not there are people near the head-mounted image display device 1 or 3, and starts the display of the external image in response to the appearance of people. Additionally, the control unit 501 controls the display area or the display size of the external image according to the location (orientation) and distance at which people appeared. The control unit 501 also controls the display area or the display size of the external image according to the number of nearby people. When there are many people, it is anticipated that the secrecy level of the image will be lowered, and thus the control unit 501 may also control the brightness level of the external image according to the number of nearby people.

C-3. Image Control According to User Status

The control unit 501 controls display operation for displaying an internal image seen from the side of the user wearing the relevant device 1 or 3 and an external image seen from the outside of the relevant device 1 or 3 according to status information about the user's current status acquired by the status information acquisition unit 505. Examples of external image and internal image display control methods according to status information are summarized in Table 3 below.

TABLE 3

Control of external/internal picture based on user status

| | Detection target | Detection method | Picture control method |
|---|---|---|---|
| Work status | Wearing/not wearing | Wear sensor | External/internal picture on/off |
| Action status | Head orientation | Gyro sensor | Change display of external picture according to head direction/rotation |

TABLE 3-continued

Control of external/internal picture based on user status

| | Detection target | Detection method | Picture control method |
|---|---|---|---|
| | Still, walking, running, moving via transportation | GPS, acceleration sensor | Vibration/shake control of external/internal picture |
| | How much eyes are open | Camera | Display icon indicating how much eyes are open Change display for every blink |
| | Gaze | Camera | Display icon indicating gaze |
| Mental status | Excitement level Alertness level Feelings/emotions | Brain waves, sweat sensor | Display user status |
| Status of communication with outside | | Microphone | Display communication status |
| Gaze, eyelid open/closed status | | Camera | Display user status (gaze direction, eyelids) |
| Body temperature | | Temperature sensor | Display body temperature |

Figure 25:
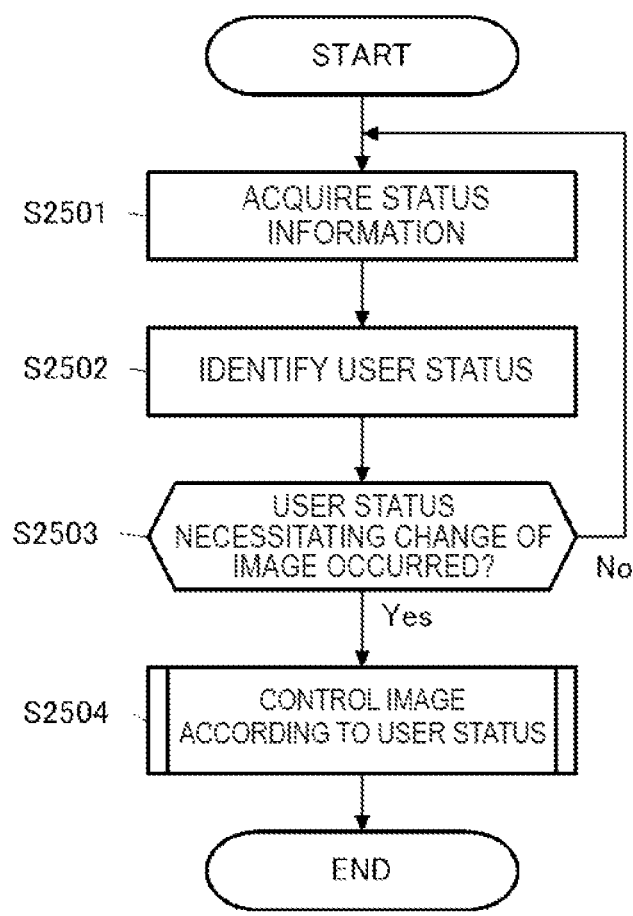
FIG. 25 is a flowchart illustrating exemplary operation of the head-mounted image display device 1 or 3 according to user status information.

FIG. 25 illustrates exemplary operation of the head-mounted image display device 1 or 3 according to user status information, in the form of a flowchart. The processing operations illustrated in the drawing are activated periodically, for example.

First, the status information acquisition unit 505 acquires output information from various status sensors (discussed earlier) as status information (step S2501). Subsequently, the control unit 501 analyzes the acquired status information (step S2502), identifies the user's current work status, action status, mental status, and physiological status, and checks whether or not a user status that should be reported to nearby people has occurred (step S2503).

Subsequently, when a user status that should be reported to nearby people occurs (step S2503, Yes), the control unit 501 controls the display of the external image according to that user status (step S2504).

Figure 26:
FIG. 26 is a diagram illustrating an example display of an icon representing a state of closed eyelids (how much the eyes are open).
Figure 27:
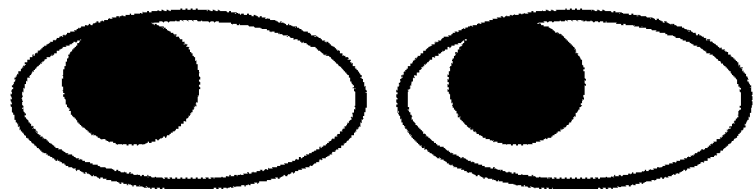
FIG. 27 is a diagram illustrating an example display of an icon representing a gaze direction (orientation of pupils).

For example, if the control unit 501 identifies the eyelid status or gaze direction on the basis of output information from a status sensor such as a myoelectric sensor, an oculo-electric sensor, or a camera, the control unit 501 displays an icon representing a state of closed eyelids (how much the eyes are open) or the gaze direction (pupil orientation) on the external image (for example, see FIGS. 26 and 27). In addition, icons like those illustrated in FIGS. 26 and 27 may also be displayed overlaid onto an external image that is the same as the internal image.

Also, if the control unit 501 identifies the user's mental status (indicating whether or not the user is immersed in or concentrating on the internal image, such as excitement level, alertness level, or feelings and emotions) on the basis of output information from status sensors, the control unit 501 displays an icon representing that mental status (not illustrated) on the external image. Furthermore, on the basis of the mental status, an acceptable condition for talking to the user, pausing the viewing of the internal image, or interrupting is determined, and an icon representing the determined condition (not illustrated), or message text such as "Currently immersed" or "Don't talk to me!", is displayed on the external image.

For example, it is known that a blink operation may be detected on the basis of output information from a status sensor such as a myoelectric sensor or an oculo-electric sensor. The control unit 501 may determine the user's mental status according to a number of blinks per unit time and a blink time. FIG. 28 illustrates an example of a method of determining the mental status (alert/drowsy/concentrating) of the user according to a number of blinks per unit time and a blink time detected with an oculo-electric technique.

Also, the control unit 501 may determine the user's mental status according to a blink interval and a blink time. FIG. 29 illustrates an example of a method of determining the mental status (alert/drowsy/concentrating) of the user according to a blink interval and a blink time detected with an oculo-electric technique.

Herein, suppose that tb is the blink time and ti is the blink interval detected with an oculo-electric technique. Also, provided that Thb is a blink time threshold, Thi is a blink interval threshold, and Mi is a blink interval maximum threshold, the average blink time A(tb) and the average blink interval A(ti) for a sampling count n are respectively calculated according to the following formulas (1) and (2).

[Math. 1]

$$A(tb)=\Sigma tb(x)/n \quad (1)$$

$$A(ti)=\Sigma ti(x)/n \quad (2)$$

Subsequently, on the basis of the average blink time A(tb) and the average blink interval A(ti) calculated according to the above formulas (1) and (2), the status is estimated according to the detection priority order indicated below.

[Math. 2]

Sleeping status: $A(ti)>=Mi$     1.

Drowsy status: $A(tb)>Thb$     2.

Concentrating status: $A(tb)<=Thb$ and $A(ti)>Thi$     3.

Normal status: $A(tb)<<=Thb$ and $A(ti)<=Thi$     4.

An image capture technique that detects a blink operation on the basis of a captured image from a camera is also known. FIG. 30 illustrates an example of a method of determining the mental status (alert/drowsy/concentrating) of the user according to a blink interval and a blink time detected with an image capture technique. With the image capture technique, on the basis of the average blink time A(tb) and the average blink interval A(ti) calculated according to the above formulas (1) and (2), the status is estimated according to the detection priority order indicated below.

[Math. 3]

Sleeping status: $A(ti)>=Mi$ or $A(Tb)>=Mi$     1.

Drowsy status: $A(tb)>Thb$     2.

Concentrating status: $A(tb)<=Thb$ and $A(ti)>Thi$     3.

Normal status: $A(tb)<<=Thb$ and $A(ti)<=Thi$     4.

With blink operations, distinguishing between closed eyes and sleep is difficult in some cases. Closed eyes and sleep are both states of not looking at the screen, but differ according to whether or not the user is aware of the display content. Brain waves while the eyes are closed may be acquired from oculo-electric electrodes. During rest with the eyes closed, an alpha wave component (a frequency of approximately 10 Hz and an amplitude of several tens of microvolts) may be observed, but during sleep, alpha waves disappear from the brain waves.

On the basis of the above estimation result, whether or not the status is an acceptable status for talking to the user may be judged as follows.

TABLE 4

| | Normal | Concentrating | Eyes closed | Sleeping |
|---|---|---|---|---|
| Acceptable to talk or not | Yes | No | Yes | Yes |
| Acceptable to pause or not | Yes | No | Yes | Yes |
| Acceptable to interrupt or not | Yes | No | Yes | No |

Also, if the control unit 501 identifies the user's action status on the basis of output information from the status sensors, the control unit 501 displays the external image to and internal image to suit that action status.

On the basis of output information from a status sensor such as a gyro sensor, an acceleration sensor, or a camera, the orientation of the user's head (or of the head-mounted image display device 1 or 3 that the user is wearing) may be detected.

Figure 31:
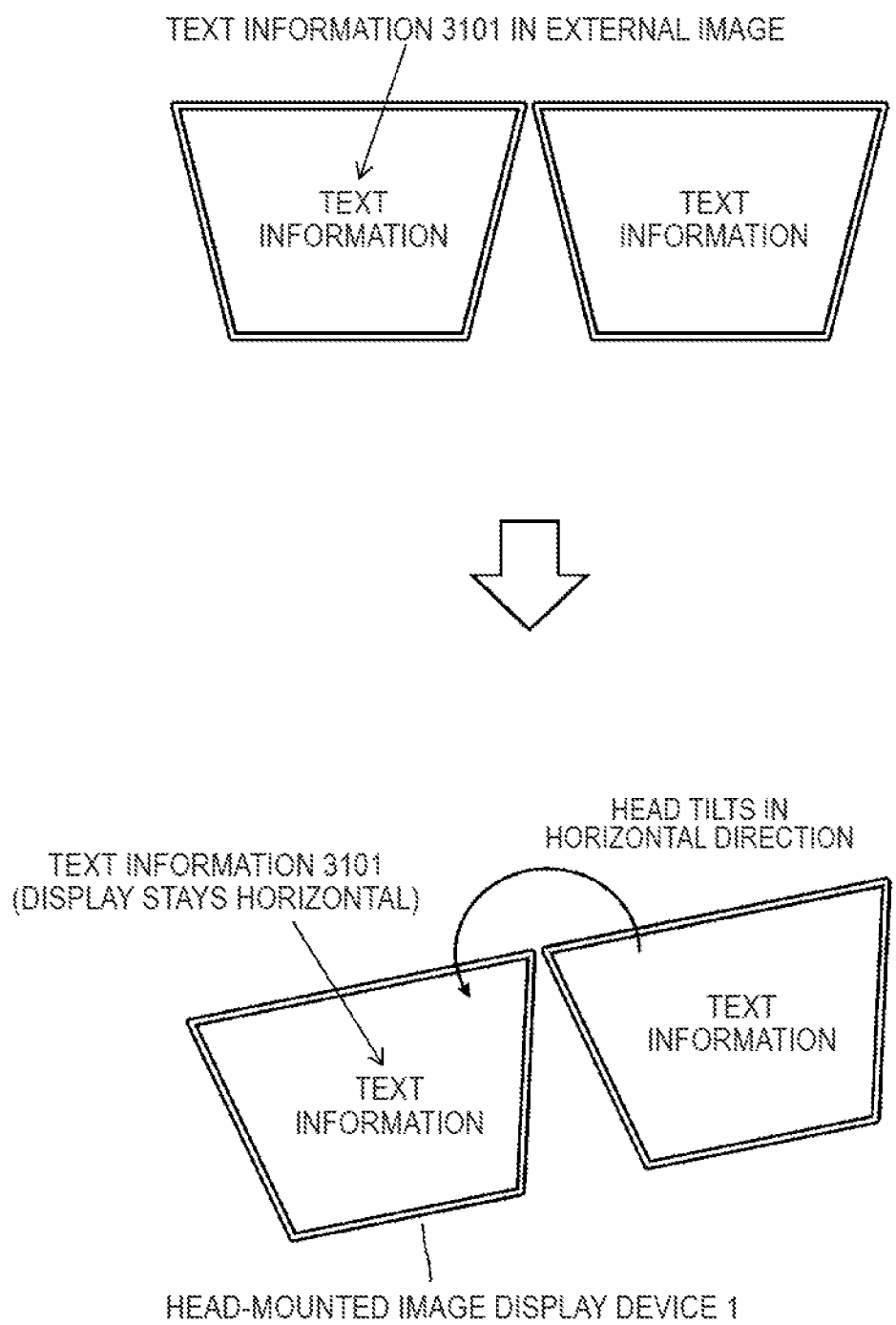
FIG. 31 is a diagram illustrating how text information 3101 being displayed in an external image is controlled to stay horizontal.

When the head is detected to be tilted horizontally (the roll direction), the control unit 501 controls text information 3101 being displayed in the external image to stay horizontal (see FIG. 31).

Figure 32:
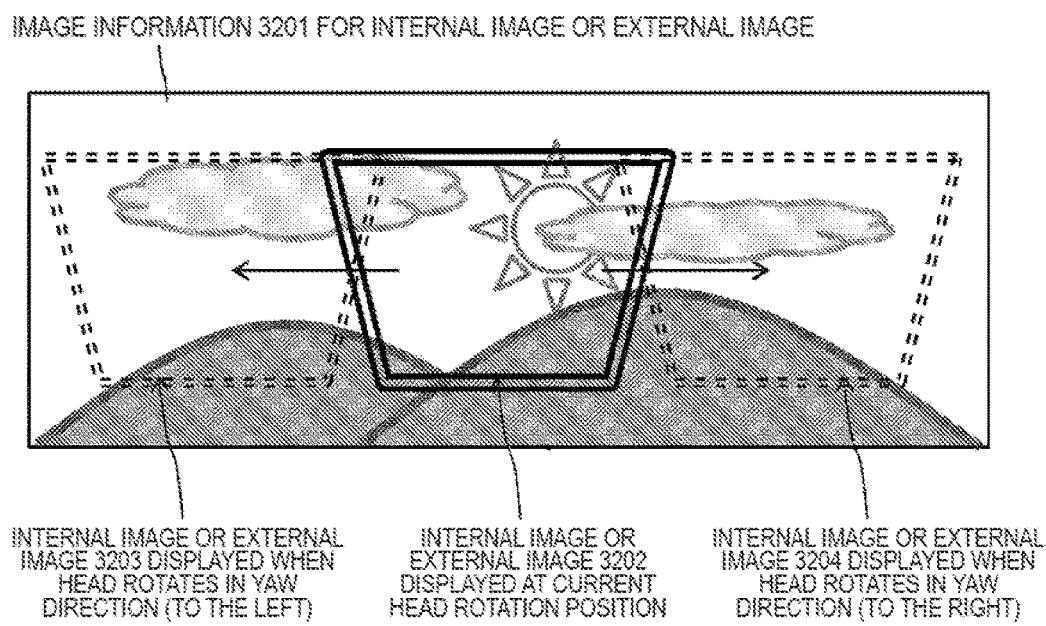
FIG. 32 is a diagram illustrating how the position of an internal image or an external image mapped to a real space is controlled to stay in place.

When the head is detected to be rotated in the (yaw direction), the control unit 501 maintains the position of an internal image or an external image mapped to a real space. For example, suppose that the image denoted by the reference number 3201 in FIG. 32 has been prepared for display of the internal image or the external image, and that for the current rotational position of the head, the area denoted by the reference number 3202 is being displayed. In such a case, if the head rotates in the yaw direction (to the left), the display moves to the display area denoted by the reference number 3203. Also, if the head rotates in the yaw direction (to the right), the display moves to the display area denoted by the reference number 3204.

Also, on the basis of output information from a status sensor such as a gyro sensor, an acceleration sensor, or a camera, an action status such as the user being still (including lying supine, sitting, and standing), walking, running, or moving via transportation may be detected. The control unit 501 controls the display of the external image to suit such an action status.

C-4. Image Control According to Display Content

The control unit 501 controls display operation for displaying an internal image seen from the side of the user wearing the relevant device 1 or 3 and an external image seen from the outside of the relevant device according to information of the content displayed as the internal image. Examples of external image and internal image display control methods according to content information are summarized in Table 5 below.

TABLE 5

| Control of external/internal picture based on picture content | | |
|---|---|---|
| Detection target | Detection method | Picture control method |
| Metadata | Decoder | Display text information, QR code |

TABLE 5-continued

Control of external/internal picture based on picture content

| Detection target | Detection method | Picture control method |
| --- | --- | --- |
| Encoded information | Decoder | Display text information, QR code |
| Playback time, playback position | Decoder | Display playback position, remaining time |
| Content details | Content analysis, picture analysis | Convert internal picture for external display |
| Internal picture/audio | Video/acoustic analysis | Link external picture to audiovisual features |

Figure 33:
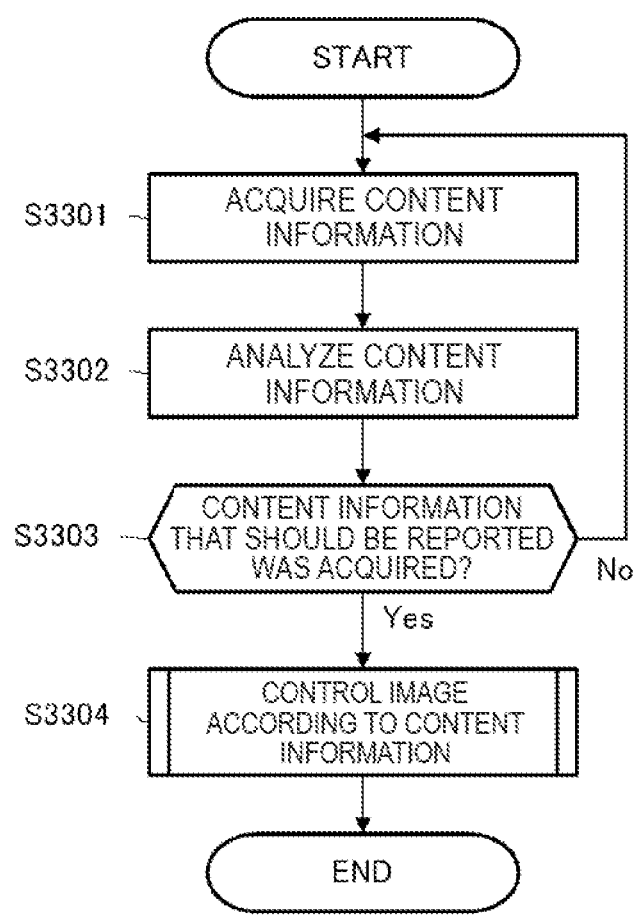
FIG. 33 is a flowchart illustrating exemplary operation of the head-mounted image display device 1 or 3 according to content information.

FIG. 33 illustrates exemplary operation of the head-mounted image display device 1 or 3 according to content information, in the form of a flowchart. The processing operations illustrated in the drawing are activated periodically, for example.

First, after the content information acquisition unit 507 acquires content information (step S3301), the control unit 501 analyzes the acquired status information (step S3302).

The content information acquisition unit 507 acquires content information such as, for example, metadata accompanying image content (such as the title, genre, and detailed information about the content, and the Uniform Resource Locator (URL) of a related site), the total playback time of the image content, the current playback position or the remaining playback time, and parental controls or other usage restriction flags.

Subsequently, the control unit 501 checks whether or not content information that should be reported to nearby people has been acquired (step S3103).

At this point, when content information that should be reported to nearby people is acquired (step S3303, Yes), the control unit 501 controls display operation for displaying an internal image seen from the side of the user wearing the relevant device 1 and an external image seen from the outside of the relevant device according to content information acquired by the content information acquisition unit 507 (step S3304).

For example, according to content information, the control unit 501 controls the turning on/off of the external image, the display method (such as the size, brightness, contrast, color tint, display position, and continuous display or intermittent display of the display image), and the information to display (such as a text string such as a URL that provides detailed information or related information about the content, or a QR code (registered trademark) that encodes such a text string). In addition, the control unit 501 controls an external image linked or associated with the content displayed as the internal image according to content information.

D. Configuration Example of Technology Disclosed in Present Application

Additionally, the present technology may also be configured as below.

(1) An image display device used by being mounted to a head or a face of a user, including:

a first display unit that displays an internal image seen from a side of the user;

a second display unit that displays an external image seen from outside the image display device; and a control unit that controls display of the internal image and the external image.

(2) The image display device according to (1), wherein the display unit is equipped with a first display device that displays the internal image and is disposed in a location seen from the user side, and a second display device that displays the external image and is disposed in a location seen from outside the image display device.

(3) The image display device according to (1), wherein the display units are equipped with a single display device that displays the internal image and the external image, and a waveguide that guides the internal image displayed on the display device to a location seen from the side of the user, while also guiding the external image displayed on the display device to a location seen from outside the image display device.

(4) The image display device according to (1), further including:

a projection unit that projects the external image externally from the image display device.

(5) The image display device according to (1), further including:

an input operating unit with which the user conducts an input operation, wherein the control unit controls display of the internal image and the external image according to an input operation by the user.

(6) The image display device according to (5), wherein the control unit, according to an input operation by the user on the input operating unit, turns display of the internal image or the external image on/off, conducts a color adjustment of the internal image or the external image, conducts a brightness adjustment of the internal image or the external image, changes a display size of the external image, or moves a display area of the external image.

(7) The image display device according to (5), wherein the control unit, according to an input operation by the user on the input operating unit, causes at least one of a same image as the internal image, a different image from the internal image, information about a surrounding environment, or a current status of the user to be displayed as the external image, or causes the external image to be displayed as the internal image.

(8) The image display device according to (5), wherein the control unit changes display of the external image according an input operation based on a blink operation or eyeball movement of the user.

(9) The image display device according to (5), wherein the control unit displays the external image as the internal image according to an input operation by the user on the input operating unit.

(10) The image display device according to (5), wherein the control unit locks operations on the external image or the internal image, or releases the lock, according to an input operation by the user on the input operating unit.

(11) The image display device according to (5), wherein the control unit, according to an input operation by the user on the input operating unit, causes a continuous display, an intermittent display, or a display at a predetermined time interval of the external image to be conducted.

(12) The image display device according to (1), further including:

an environmental information acquisition unit that acquires information related to a surrounding environment of the image display device, wherein the control unit controls display of the internal image and the external image on the basis of the surrounding environment.

(13) The image display device according to (12), wherein the control unit controls a brightness of the external image in response to a detection of a change in environmental lighting.

(14) The image display device according to (12), wherein the control unit controls an intermittent display or a timer display of the external image in response to an elapsing of a current time.

(15) The image display device according to (12), wherein the control unit controls a turning of display on/off, a brightness level, a display area, and a display size of the external image according to a number of people nearby.

(16) The image display device according to (1), further including:
a status information acquisition unit that acquires information related to a status of the user,
wherein the control unit controls display of the internal image and the external image on the basis of a status of the user.

(17) The image display device according to (16), wherein the control unit displays a current work status, action status, mental status, or physiological status of the user acquired by the status information acquisition unit as the external image.

(18) The image display device according to (16), wherein the control unit identifies a mental status of the user on the basis of information of a blink operation of the user, and controls display of the external image according to the mental status.

(19) The image display device according to (16), wherein the control unit controls display of the external image to suit a current action status of the user acquired by the status information acquisition unit.

(20) The image display device according to (16), wherein the control unit controls text information in the external image to stay horizontal according to a horizontal tilt of the head of the user.

(21) The image display device according to (16), wherein the control unit controls a position of the internal image or the external image to stay in place according to a rotation of the head of the user.

(22) The image display device according to (1), further including:
a content information acquisition unit that acquires content information related to image content to be displayed on the internal display unit,
wherein the control unit controls display of the external image according to the content information.

(23) An image display method used by being mounted to a head or a face of a user, including:
a first display step that displays an internal image seen from a side of the user;
a second display step that displays an external image seen from outside the image display device; and
a control step that controls display of the internal image and the external image.

(24) A computer-readable recording medium having a computer program recorded thereon, the computer program controlling an image display device used by being mounted on a head or a face of a user, the computer program causing the computer to function as:
a first display unit that causes an internal image seen from a side of the user to be displayed;
a second display unit that causes an external image seen from outside the image display device to be displayed; and
a control unit that controls display of the internal image and the external image.

CITATION LIST

Patent Literature

Patent Literature 1: JP 2012-141461A
Patent Literature 2: JP 2012-42654A
Patent Literature 3: JP 2000-75815A
Patent Literature 4: JP 2007-251331A
Patent Literature 5: U.S. Pat. No. 6,198,523A

INDUSTRIAL APPLICABILITY

The foregoing thus describes the technology disclosed in this specification in detail and with reference to specific embodiments. However, it is obvious that persons skilled in the art may make modifications and substitutions to these embodiments without departing from the spirit of the technology disclosed in this specification.

Although head-mounted image display devices may be categorized into opaque and see-through types, the technology disclosed in this specification may be applied to either of these types. Furthermore, although head-mounted image display devices may be categorized into a binocular type equipped with a display unit for both the left and right eyes, or a monocular type equipped with a display unit for only one of either left or right, the technology disclosed in this specification may be applied to either of these types. In addition, the head-mounted image display device obviously may also be glasses type or behind-the-ear type.

Essentially, the technology disclosed in this specification has been described by way of example, and the stated content of this specification should not be interpreted as being limiting. The spirit of the technology disclosed in this specification should be determined in consideration of the claims.

REFERENCE SIGNS LIST 1 head-mounted image display device (opaque type)
3 head-mounted image display device (see-through type)
501 control unit
501A ROM
501B RAM
502 input operating unit
503 remote control receiving unit
504 environmental information acquisition unit
505 status information acquisition unit
506 communication unit
507 content information acquisition unit
508 image processing unit
508-1 internal image generating unit
508-2 external image generating unit
509, 510 display driving unit
511, 512 display panel
513 virtual image optical unit
514 projection optical unit
609 image multiplexing unit
610 display driving unit
611 display panel
612 virtual image/real image optical unit
801 collimating optical unit
802 half-wave plate
803 waveguide
804 polarization beam splitter
805 quarter-wave plate
806 concave mirror
807 screen 2101 waveguide
2102 half-silvered mirror
2103 concave mirror
2104 collimating optical unit
2105 screen
2201 waveguide
2202 half-silvered mirror
2203 plane mirror
2204 collimating optical unit
2205 projection optical unit
2206 screen

The invention claimed is:

1. An image display device configured to be mounted to one of a head or a face of a first user, comprising:
   a first side comprising a first display unit, wherein the first side faces the face of the first user that mounts the image display device, and
   wherein the first display unit is configured to:
      display an internal image on the first side of the image display device, wherein the internal image is viewable to the first user that mounts the image display device; and
   a second side comprising a second display unit, wherein the second side is opposite to the first side, and
   wherein the second display unit is configured to:
      display an external image on the second side of the image display device, wherein the external image is viewable to at least one second user different from the first user; and
   a control unit configured to:
      control display of the internal image viewable to the first user; and
      control display of the external image viewable to the at least one second user.

2. The image display device according to claim 1, wherein the first display unit and the second display unit are equipped with a single display device,
   wherein the single display device is configured to display the internal image and the external image, and
   wherein the image display device further comprises a waveguide configured to:
      guide the internal image displayed on the single display device to a first location on the first side; and
      guide the external image displayed on the single display device to a second location on the second side.

3. The image display device according to claim 1, further comprising: a projection unit configured to enlarge and project the external image.

4. The image display device according to claim 1, wherein the control unit is further configured to:
   receive an input operation from the first user; and
   control display of the internal image and the external image based on the received input operation.

5. The image display device according to claim 4, wherein based on the received input operation, the control unit is further configured to control at least one of turn the display of at least one of the internal image or the external image on/off, adjust a color of at least one of the internal image or the external image, adjust a brightness of at least one of the internal image or the external image, change a display size of the external image, or move a display area of the external image.

6. The image display device according to claim 4, wherein based on the input operation, the control unit is further configured to display at least one of a same image as the internal image and the external image, different images for the internal image and the external image, information about a surrounding environment of the image display device as the external image, or a current status of the first user as the external image.

7. The image display device according to claim 4, wherein the control unit is further configured to change the display of the external image based on at least one of a blink operation or eyeball movement of the first user.

8. The image display device according to claim 4, wherein the control unit is further configured to display the external image at least one of continuously, intermittently or at a time interval based on the received input operation.

9. The image display device according to claim 1, wherein the control unit is further configured to:
   acquire a first information related to a surrounding environment of the image display device; and
   control the display of the internal image and the external image based on the acquired first information related to the surrounding environment.

10. The image display device according to claim 9, wherein the control unit is further configured to:
    detect a change in environmental lighting based on the acquired first information related to the surrounding environment; and
    control a brightness of the external image based on the detected change in the environmental lighting.

11. The image display device according to claim 1, wherein the control unit is further configured to control at least one of an intermittent display or a timer display of the external image based on a current time.

12. The image display device according to claim 1, wherein the control unit is further configured to control at least one of a turning on/off of the display of the external image, a brightness level of the external image, a display area of the external image, or a display size of the external image based on a number of the at least one second user within a distance from the image display device.

13. The image display device according to claim 1, wherein the control unit is further configured to:
    acquire a second information related to a status of the first user; and
    control display of the internal image and the external image based on the acquired second information related to the status of the first user.

14. The image display device according to claim 13, wherein the control unit is further configured to
    display the acquired second information related to the status of the first user as the external image,
    wherein the acquired second information comprises at least one of a current work status, an action status, a mental status, or a physiological status of the first user.

15. The image display device according to claim 13, wherein the control unit is further configured to:
    identify a mental status of the first user based on the acquired second information,
    wherein the acquired second information comprises information that corresponds to a blink operation of the first user; and
    control the display of the external image based on the identified mental status.

16. The image display device according to claim 13, wherein the control unit is further configured to:
    detect a horizontal tilt of the head of the first user; and
    control text information in the external image to remain horizontal based on the detected horizontal tilt of the head of the first user.

17. The image display device according to claim 13, wherein the control unit is further configured to control a position of at least one of the internal image or the external image based on a rotation of the head of the first user.

18. The image display device according to claim 1, wherein the control unit is further configured to:
   acquire content information related to image content of the internal image displayed by the first display unit; and
   control the display of the external image based on the content information.

19. An image display method, comprising:
   in an image display device configured to be mounted to one of a head or a face of a first user:
      displaying an internal image on a first side of the image display device, wherein the first side faces the face of the first user, wherein the internal image is viewable to the first user that mounts the image display device;
      displaying an external image on a second side of the image display device, wherein the second side is opposite to the first side, wherein the external image is viewable to at least one second user different from the first user; and
      controlling display of the internal image viewable to the first user and display of the external image viewable to the at least one second user.

20. A non-transitory computer-readable medium having stored thereon computer-executable instructions that, when executed by a processor, cause a computer to execute operations, the operations comprising:
   in an image display device configured to be mounted to one of a head or a face of a first user:
      displaying an internal image on a first side of the image display device, wherein the first side faces the face of the first user, wherein the internal image is viewable to the first user that mounts the image display device;
      displaying an external image on a second side of the image display device, wherein the second side is opposite to the first side, wherein the external image is viewable to at least one second user different from the first user; and
      controlling display of the internal image viewable to the first user and display of the external image viewable to the at least one second user.

21. The image display device according to claim 2, further comprising:
   an image multiplexing unit configured to multiplex frames of the internal image and the external image,
   wherein the single display device is further configured to display the multiplexed internal image and the external image.

* * * * *